US012617944B2

(12) United States Patent
Takahashi et al.

(10) Patent No.: US 12,617,944 B2
(45) Date of Patent: May 5, 2026

(54) CURABLE RESIN COMPOSITION, TEMPORARY FIXING MATERIAL, AND ELECTRONIC COMPONENT MANUFACTURING METHOD

(71) Applicant: SEKISUI CHEMICAL CO., LTD., Osaka (JP)

(72) Inventors: Toshio Takahashi, Osaka (JP); Tokushige Shichiri, Osaka (JP); Satoshi Hayashi, Osaka (JP); Izumi Daido, Osaka (JP); Fumika Hoshino, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 599 days.

(21) Appl. No.: 18/025,232

(22) PCT Filed: Sep. 22, 2021

(86) PCT No.: PCT/JP2021/034853

§ 371 (c)(1),
(2) Date: Mar. 8, 2023

(87) PCT Pub. No.: WO2022/065376

PCT Pub. Date: Mar. 31, 2022

(65) Prior Publication Data

US 2023/0312923 A1 Oct. 5, 2023

(30) Foreign Application Priority Data

Sep. 23, 2020 (JP) ................................ 2020-159179
Sep. 23, 2020 (JP) ................................ 2020-159180
Sep. 23, 2020 (JP) ................................ 2020-159181

(51) Int. Cl.

| | |
|---|---|
| ***C08F 2/46*** | (2006.01) |
| ***C08F 2/50*** | (2006.01) |
| ***C08G 61/04*** | (2006.01) |
| ***C08K 5/3415*** | (2006.01) |
| ***C08L 79/08*** | (2006.01) |
| ***C09J 179/08*** | (2006.01) |

(52) U.S. Cl.

CPC ............ *C08L 79/08* (2013.01); *C08K 5/3415* (2013.01); *C09J 179/08* (2013.01)

(58) Field of Classification Search

CPC .......................... C08G 73/12; C08G 73/1082; C08G 73/1039; C09J 179/08; C09J 179/085; C09J 7/30; C09J 2203/326; C09J 2479/08; C08K 3/013; C08K 5/3467; C08K 5/02; C08K 5/3415; C07D 209/48; C07D 207/42; C07D 487/04; C08L 83/04; C08L 79/08; C08L 79/085

USPC ................. 522/83, 71, 1, 6, 189, 184; 520/1

See application file for complete search history.

(56) References Cited

U.S. PATENT DOCUMENTS

| | | | | |
|---|---|---|---|---|
| 5,438,104 | A * | 8/1995 | Kishi | C08L 79/08 524/424 |
| 2006/0229384 | A1 | 10/2006 | Sakayori | |
| 2007/0090299 | A1 | 4/2007 | Kozakai et al. | |
| 2012/0135251 | A1 | 5/2012 | Jeong et al. | |
| 2021/0017317 | A1 | 1/2021 | Umehara et al. | |
| 2021/0054197 | A1 | 2/2021 | Umehara et al. | |
| 2022/0162480 | A1 | 5/2022 | Shichiri | |
| 2022/0169791 | A1 | 6/2022 | Sugawara et al. | |
| 2023/0312923 | A1 | 10/2023 | Takahashi et al. | |
| 2023/0348767 | A1 * | 11/2023 | Daido | C08G 73/12 |

FOREIGN PATENT DOCUMENTS

| | | |
|---|---|---|
| JP | 5-32946 | 2/1993 |
| JP | 9-12712 | 1/1997 |
| JP | 2003-231872 | 8/2003 |
| JP | 2005-82628 | 3/2005 |
| JP | 2005-314673 | 11/2005 |
| JP | 2011-74245 | 4/2011 |
| JP | 2012-251080 | 12/2012 |
| JP | 2013-505822 | 2/2013 |
| JP | 2013-79360 | 5/2013 |
| JP | 2013-194056 | 9/2013 |
| JP | 2013-199645 | 10/2013 |
| JP | 2015-193725 | 11/2015 |

(Continued)

OTHER PUBLICATIONS

Hayashi et al, JP 2020132881 Machine Translation, Aug. 31, 2020 (Year: 2020).*
Robert J. Iredale et al., "Modern advances in bismaleimide resin technology: A 21st century perspective on the chemistry of addition polyimides", Progress in Polymer Science, 2017, vol. 69, pp. 1-21.
International Search Report issued Nov. 9, 2021 in corresponding International (PCT) Patent Application No. PCT/JP2021/034853.
International Search Report issued Dec. 14, 2021 in International (PCT) Application No. PCT/JP2021/034877.
U.S. Appl. No. 18/025,730, filed Mar. 10, 2023.

(Continued)

*Primary Examiner* — Jessica Whiteley
(74) *Attorney, Agent, or Firm* — Wenderoth, Lind & Ponack, L.L.P.

(57) ABSTRACT

The present invention aims to provide a curable resin composition that can reduce the occurrence of voids and partial detachment between the composition and a support even in high-temperature processing at 300° C. or higher with an adherend fixed to the support with the composition, and is easily separable after the high-temperature processing. The present invention also aims to provide a temporary fixing material including an adhesive layer containing the curable resin composition and a method of producing an electronic component using the temporary fixing material. Provided is a curable resin composition containing: a maleimide group-containing reactive compound (1); and a resin (2) having an imide skeleton in a backbone repeating unit.

25 Claims, No Drawings

(56) References Cited

FOREIGN PATENT DOCUMENTS

| | | | | |
|---|---|---|---|---|
| JP | 2016-113498 | | | 6/2016 |
| JP | 2017-48266 | | | 3/2017 |
| JP | 2017-73541 | | | 4/2017 |
| JP | 2017-105749 | | | 6/2017 |
| JP | 2017-121807 | | | 7/2017 |
| JP | 2017-173479 | | | 9/2017 |
| JP | 2017-222745 | | | 12/2017 |
| JP | 2018-531317 | | | 10/2018 |
| JP | 2018-203959 | | | 12/2018 |
| JP | 2020-84109 | | | 6/2020 |
| JP | 2020-132881 | | | 8/2020 |
| JP | 2020-525575 | | | 8/2020 |
| JP | 2020132881 | A | * | 8/2020 |
| TW | 201116928 | | | 5/2011 |
| TW | 201542674 | | | 11/2015 |
| TW | 201942674 | | | 11/2019 |
| WO | 2011/037706 | | | 3/2011 |
| WO | 2015/182469 | | | 12/2015 |
| WO | 2017/027482 | | | 2/2017 |
| WO | 2017/111134 | | | 6/2017 |
| WO | 2018/155029 | | | 8/2018 |
| WO | 2018/237377 | | | 12/2018 |
| WO | 2019/188185 | | | 10/2019 |
| WO | 2019/188189 | | | 10/2019 |
| WO | 2019/189467 | | | 10/2019 |
| WO | 2020/012978 | | | 1/2020 |
| WO | 2020/137980 | | | 7/2020 |
| WO | 2020/189354 | | | 9/2020 |

OTHER PUBLICATIONS

Sigma-Aldrich product data sheet "1,4-Butanediol dimethacrylate", retrived on Mar. 21, 2025 (Year: 2025).

Office Action issued Mar. 27, 2025 in related U.S. Appl. No. 18/025,730.

* cited by examiner

CURABLE RESIN COMPOSITION, TEMPORARY FIXING MATERIAL, AND ELECTRONIC COMPONENT MANUFACTURING METHOD

TECHNICAL FIELD

The present invention relates to a curable resin composition that can reduce the occurrence of voids and partial detachment between the composition and a support even in high-temperature processing at 300° C. or higher with an adherend fixed to the support with the composition, and is easily separable after the high-temperature processing. The present invention also relates to a temporary fixing material including an adhesive layer containing the curable resin composition and a method for producing an electronic component using the temporary fixing material.

BACKGROUND ART

During the processing of electronic components such as semiconductors, electronic components are fixed to supports using adhesive compositions or protected by adhesive tapes attached thereto for easier handling or less breakage of the electronic components. In the case where a thick wafer cut out from a highly pure silicon single crystal is ground to a thin wafer having a predetermined thickness, for example, the thick wafer is attached to a support using an adhesive composition.

Adhesive compositions and adhesive tapes thus used with electronic components are required to have high adhesiveness to firmly fix electronic components during the processing, as well as separability from the electronic components without causing damage to the electronic components after the processing (hereafter, also referred to as "high adhesion and easy separation").

As a means for achieving high adhesion and easy separation, Patent Literature 1, for example, discloses an adhesive sheet produced using an adhesive in which to a side chain or main chain of a polymer is bonded a polyfunctional monomer or oligomer containing a radiation polymerizable functional group. The polymer is cured by irradiation with UV as it has the radiation polymerizable functional group, which allows lowering of the adhesion by irradiation with UV upon separation of the adhesive sheet, enabling separation without adhesive deposits.

CITATION LIST

Patent Literature

Patent Literature 1: JP H05-32946 A

SUMMARY OF INVENTION

Technical Problem

Recent higher-performance electronic components are subjected to various types of processing. For example, in the process of forming a thin metal film on a surface of an electronic component by sputtering, the processing is performed at high temperature of around 300° C. to 350° C. to form a thin metal film having higher electroconductivity.

However, high-temperature processing at 300° C. or higher performed on an electronic component protected using a conventional adhesive composition or adhesive tape may cause voids or partial detachment between the adhesive composition or tape and the support fixing the electronic component during the high-temperature processing, and may also cause a rise in adhesion, leading to insufficient lowering of the adhesion or the generation of adhesive deposits upon separation.

Especially in recent years, polyimide resins, which are highly heat-resistant materials, have been used in many electronic components, and polyimide resin adherends have been fixed to inorganic material supports (e.g., glass supports) and subjected to various types of processing. When subjected to high-temperature processing at 300° C. or higher, polyimide resin adherends tend to suffer a greater rise in adhesion than inorganic material adherends. The adhesive composition or adhesive tape used in such a case to protect the polyimide adherend needs to reduce a rise in adhesion to the polyimide resin adherend, while also reducing the occurrence of voids and partial detachment between the composition or tape and the support.

The present invention aims to provide a curable resin composition that can reduce the occurrence of voids and partial detachment between the composition and a support even in high-temperature processing at 300° C. or higher with an adherend fixed to the support with the composition, and is easily separable after the high-temperature processing. The present invention also aims to provide a temporary fixing material including an adhesive layer containing the curable resin composition and a method for producing an electronic component using the temporary fixing material.

Solution to Problem

The present invention relates to a curable resin composition containing a maleimide group-containing reactive compound (1) and a resin (2) having an imide skeleton in a backbone repeating unit.

The present invention is described in detail below.

The present inventors studied curable resin compositions containing a maleimide group-containing reactive compound (1) and a resin (2) having an imide skeleton in a backbone repeating unit. The present inventors have found out that such a curable resin composition can reduce the occurrence of voids and partial detachment between the composition and a support even in high-temperature processing at 300° C. or higher with an adherend, particularly a polyimide adherend, fixed to the support with the composition, and is easily separable after the high-temperature processing. The inventors thus completed the present invention.

The curable resin composition of the present invention contains a maleimide group-containing reactive compound (1) and a resin (2) having an imide skeleton in a backbone repeating unit.

Containing the maleimide group-containing reactive compound (1), the curable resin composition of the present invention as a whole can uniformly and quickly polymerize and crosslink when heated or irradiated with light. The resulting increase in the modulus of elasticity greatly decreases adhesion, preventing a rise in adhesion to the adherend or the generation of adhesive deposits upon separation from the adherend.

The resin (2) having an imide skeleton in a backbone repeating unit has very high heat resistance because of the imide skeleton, and is less likely to suffer degradation of the backbone even in high-temperature processing at 300° C. or higher. Therefore, the curable resin composition of the present invention, containing the resin (2) having an imide skeleton in a backbone repeating unit, can reduce the occurrence of voids and partial detachment between the composition and the support during high-temperature processing, and also can prevent a rise in adhesion to the adherend or the generation of adhesive deposits upon separation from the adherend.

In the maleimide group-containing reactive compound (1), the maleimide group may be substituted or unsubstituted.

The maleimide group-containing reactive compound (1) is not limited, but is preferably a bismaleimide compound (1-I) or a compound (1-II) containing a maleimide group and having an imide skeleton in a backbone repeating unit.

These maleimide group-containing reactive compounds (1) may be used alone or in combination of two or more thereof.

The bismaleimide compound (1-I) is a compound containing two maleimide groups.

The molecular weight of the bismaleimide compound (1-I) is not limited but is preferably 5,000 or less, more preferably 2,000 or less.

The bismaleimide compound (1-I) is preferably a compound containing two maleimide groups and an aliphatic group derived from a diamine compound. The diamine compound may be an aliphatic diamine compound or an aromatic diamine compound but is preferably an aliphatic diamine compound. Using an aliphatic diamine compound as the diamine compound allows an adhesive layer formed using the curable resin composition to exhibit high flexibility, and thus to exhibit high conformability to adherends with irregularities and be more easily separated upon separation.

Of the aliphatic diamine compounds, dimer diamines are preferred to achieve higher flexibility and to allow the bismaleimide compound (1-I) to have higher compatibility with solvents and other components to facilitate the formation of an adhesive layer.

The dimer diamine is a diamine compound obtainable by reducing and aminating cyclic or acyclic dimer acid obtained as a dimer of an unsaturated fatty acid, and examples thereof include linear, monocyclic, and polycyclic dimer diamines. The dimer diamine may contain a carbon-carbon unsaturated double bond and may be a hydrogenated product obtained by adding hydrogen.

More specifically, for example, the aliphatic group derived from a dimer diamine is preferably at least one selected from the group consisting of a group represented by the following formula (4-1), a group represented by the following formula (4-2), a group represented by the following formula (4-3), and a group represented by the following formula (4-4). More preferred among these is a group represented by the following formula (4-2).

[Chem. 1]

(4-1)

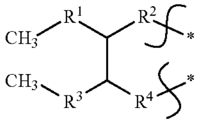

(4-2)

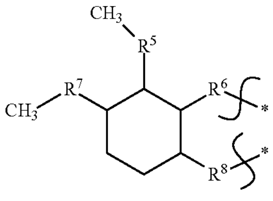

-continued (4-3)

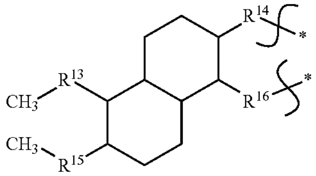

(4-4)

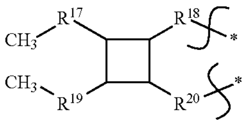

In the formulas (4-1) to (4-4), $R^1$ to $R^8$ and $R^{13}$ to $R^{20}$ each independently represent a linear or branched hydrocarbon group. Herein, "*" represents a bond. A bond * may directly bind to a maleimide group, or may bind thereto via another group.

In the formulas (4-1) to (4-4), the hydrocarbon groups represented by $R^1$ to $R^8$ and $R^{13}$ to $R^{20}$ are not limited and may be saturated hydrocarbon groups or unsaturated hydrocarbon groups. A combination of $R^1$ and $R^2$, a combination of $R^3$ and $R^4$, a combination of $R^5$ and $R^6$, a combination of $R^7$ and $R^8$, a combination of $R^{18}$ and $R^{14}$, a combination of $R^{15}$ and $R^{18}$, a combination of $R^{17}$ and $R^{18}$, and a combination of $R^{18}$ and $R^{20}$ each preferably has a total carbon number of 7 or greater and 50 or less. When the total carbon number is within the above range, an adhesive layer formed using the curable resin composition can exhibit higher flexibility, and the bismaleimide compound (1-I) can have even higher compatibility with solvents and other components. The total carbon number is more preferably 9 or greater, still more preferably 12 or greater, even more preferably 14 or greater. The total carbon number is more preferably 35 or less, still more preferably 25 or less, even more preferably 18 or less.

No limitation is given on the optical isomerism of the group represented by the formula (4-1), the group represented by the formula (4-2), the group represented by the formula (4-3), and the group represented by the formula (4-4), and any optical isomers may be included.

When containing the compound (1-II) containing a maleimide group and having an imide skeleton in a backbone repeating unit, the curable resin composition can exhibit higher heat resistance. In other words, the curable resin composition can further reduce the occurrence of voids and partial detachment between the composition and the support during high-temperature processing, and also can further prevent a rise in adhesion to the adherend or the generation of adhesive deposits upon separation from the adherend.

The compound (1-II) containing a maleimide group and having an imide skeleton in a backbone repeating unit preferably has a maleimide functional group equivalent (weight average molecular weight/number of maleimide groups) of 4,000 or less. When the functional group equivalent is 4,000 or less, the curable resin composition can exhibit higher heat resistance. A compound containing maleimide groups at a density not lower than a certain level in the molecule has a shorter distance between crosslinking points, which presumably further reduces a rise in adhesion. The functional group equivalent is more preferably 3,000 or less, still more preferably 2,000 or less. The lower limit of the functional group equivalent is not limited but is practically about 600.

The compound (1-II) containing a maleimide group and having an imide skeleton in a backbone repeating unit preferably has a lower weight average molecular weight (Mw) than the resin (2) having an imide skeleton in a backbone repeating unit. Specifically, the compound (1-II) containing a maleimide group and having an imide skeleton in a backbone repeating unit preferably has a weight average molecular weight (Mw) of 1,000 or greater and less than 20,000. When the weight average molecular weight is 1,000 or greater, the curable resin composition can easily form a film, and the resulting adhesive layer exhibits flexibility to some degree. Such an adhesive layer can exhibit high conformability to adherends with irregularities and be more easily separated upon separation. When the weight average molecular weight is less than 20,000, the compound (1-II) containing a maleimide group and having an imide skeleton in a backbone repeating unit can have higher solubility in solvents. The weight average molecular weight is more preferably 2,000 or greater and less than 10,000.

The weight average molecular weight is measured by gel permeation chromatography (GPC) as a polystyrene equivalent molecular weight. Specifically, it can be measured using an APC system (produced by Waters Corporation, or its equivalent product) under the conditions of a mobile phase of THF, a flow rate of 1.0 mL/min, a column temperature of 40° C., a sample concentration of 0.2% by weight, and an RI/PDA detector. A column used may be HR-MB-M 6.0×150 mm (trade name, produced by Waters Corporation, or its equivalent product).

The compound (1-II) containing a maleimide group and having an imide skeleton in a backbone repeating unit may have a maleimide group in a side chain or at an end. Preferably, maleimide groups are present at both ends, more preferably at both ends and in a side chain. The maleimide groups at the ends of the compound (1-II) containing a maleimide group and having an imide skeleton in a backbone repeating unit have high reactivity and thus allow the curable resin composition to more sufficiently cure when heated or irradiated with light. As a result, a rise in adhesion to the adherend or the generation of adhesive deposits upon separation from the adherend can be further prevented.

Additionally, the presence of a maleimide group in a side chain of the compound (1-II) containing a maleimide group and having an imide skeleton in a backbone repeating unit allows the curable resin composition to exhibit higher heat resistance. This is presumably because a shorter distance between crosslinking points can further reduce a rise in adhesion. Moreover, the presence of a maleimide group in a side chain of the compound (1-II) containing a maleimide group and having an imide skeleton in a backbone repeating unit makes it easy to adjust the functional group equivalent to be 4,000 or less while adjusting the weight average molecular weight to be 1,000 or greater. The curable resin composition thus can have sufficient initial pressure-sensitive or heat-sensitive adhesion, while further reducing the occurrence of voids and partial detachment during high-temperature processing and further preventing a rise in adhesion to the adherend or the generation of adhesive deposits upon separation from the adherend.

Specific examples of the compound (1-II) containing a maleimide group and having an imide skeleton in a backbone repeating unit include the following compound: a compound (1-ii) containing a structural unit represented by the following formula (1a), a structural unit represented by the following formula (1b), and a structural unit represented by the following formula (1c), and having ends represented by $X^1$ and $X^2$.

[Chem. 2]

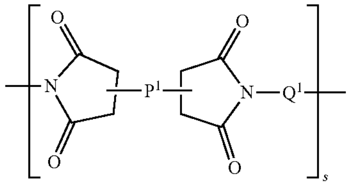

(1a)

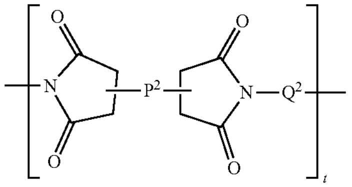

(1b)

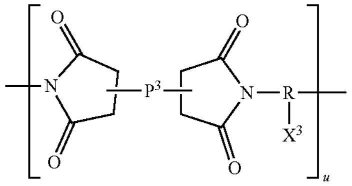

(1c)

In the formulas (1a) to (1c), s>0, t≥0, and u≥0 are satisfied; $P^1$, $P^2$, and $P^3$ each independently represent an aromatic group; $Q^1$ represents a substituted or unsubstituted linear, branched, or cyclic aliphatic group; $Q^2$ represents a substituted or unsubstituted aromatic structure-containing group; R represents a substituted or unsubstituted branched aliphatic or aromatic group; and at least one selected from the group consisting of $X^1$, $X^2$, and $X^3$ represents a maleimide group-containing group.

In the formulas (1a) to (1c), $P^1$, $P^2$, and $P^3$ are preferably C5-C50 aromatic groups. When $P^1$, $P^2$, and $P^3$ are C5-C50 aromatic groups, the curable resin composition can exhibit higher heat resistance. In other words, the curable resin composition can further reduce the occurrence of voids and partial detachment between the composition and the support during high-temperature processing, and also can further prevent a rise in adhesion to the adherend or the generation of adhesive deposits upon separation from the adherend.

In the formula (1a), $Q^1$ is preferably a substituted or unsubstituted linear, branched, or cyclic C2-C100 aliphatic group. When $Q^1$ is a substituted or unsubstituted linear, branched, or cyclic C2-C100 aliphatic group, an adhesive layer formed using the curable resin composition can exhibit high flexibility, and thus can exhibit high conformability to adherends with irregularities and be more easily separated upon separation.

$Q^1$ is also preferably an aliphatic group derived from a diamine compound. The aliphatic group derived from a diamine compound may be the same as the above aliphatic group derived from a diamine compound for the bismaleimide compound (1-I). In particular, $Q^1$ is preferably an aliphatic group derived from a dimer diamine to achieve higher flexibility and to allow the compound (1-II) containing a maleimide group and having an imide skeleton in a backbone repeating unit to have higher compatibility with solvents and other components to facilitate the formation of an adhesive layer. The aliphatic group derived from a dimer diamine may also be the same as the above aliphatic group derived from a dimer diamine for the bismaleimide compound (1-I).

In the formula (1b), $Q^2$ is preferably a substituted or unsubstituted C5-C50 aromatic structure-containing group. When $Q^2$ is a substituted or unsubstituted C5-C50 aromatic structure-containing group, the curable resin composition can exhibit higher heat resistance. In other words, the curable resin composition can further reduce the occurrence of voids and partial detachment between the composition and the support during high-temperature processing, and also can further prevent a rise in adhesion to the adherend or the generation of adhesive deposits upon separation from the adherend.

In the formula (1c), R is preferably a substituted or unsubstituted branched C2-C100 aliphatic group or aromatic group. When R is a substituted or unsubstituted branched C2-C100 aliphatic group or aromatic group, an adhesive layer formed using the curable resin composition can exhibit high flexibility, and thus can exhibit high conformability to adherends with irregularities and be more easily separated upon separation.

In the formula (1c), preferably, R is an aromatic ester group- or aromatic ether group-containing aromatic group, and the aromatic ester group or the aromatic ether group in R binds to $X^3$.

Here, the "aromatic ester group" refers to a group in which an ester group directly binds to an aromatic ring and the "aromatic ether group" refers to a group in which an ether group directly binds to an aromatic ring. When an aromatic group thus serves as a site binding to an ester group or ether group, the curable resin composition can exhibit higher heat resistance. In other words, the curable resin composition can further reduce the occurrence of voids and partial detachment during high-temperature processing, and can also further prevent a rise in adhesion to the adherend or the generation of adhesive deposits upon separation from the adherend. As $X^3$ binds to R via an aromatic ester group or aromatic ether group, the double bond in $X^3$ does not conjugate with R, so that polymerization and crosslinking under heating or irradiation with light are not disturbed.

In the compound (1-II) containing a maleimide group and having an imide skeleton in a backbone repeating unit, at least one selected from the group consisting of $X^1$, $X^2$, and $X^3$ is a maleimide group-containing group. Preferably, at least $X^3$ is a maleimide group-containing group. When at least $X^3$ is a maleimide group-containing group, the curable resin composition can exhibit higher heat resistance. In other words, the curable resin composition can further reduce the occurrence of voids and partial detachment during high-temperature processing, and can also further prevent a rise in adhesion to the adherend or the generation of adhesive deposits upon separation from the adherend.

When any of $X^1$, $X^2$, and $X^3$ is a functional group other than the maleimide group-containing group, examples of the group other than the maleimide group-containing group each independently include aliphatic groups, alicyclic groups, aromatic groups, acid anhydrides, and amine compounds. Specific examples include a one-end-unreacted product of an acid anhydride that is a raw material of the compound (1-II) containing a maleimide group and having an imide skeleton in a backbone repeating unit and a one-end-unreacted product of a diamine compound that is a raw material of the compound (1-II). For example, the group other than the maleimide group-containing group may be a group containing a double bond-containing functional group such as a citraconimide group, a vinyl ether group, an allyl group, or a (meth)acrylic group.

In the formulas (1a) to (1c), s, t, and u respectively correspond to the amounts (mol %) of the structural unit represented by the formula (1a), the structural unit represented by the formula (1b), and the structural unit represented by the formula (1c) in the compound (1-II) containing a maleimide group and having an imide skeleton in a backbone repeating unit.

The amount (s) of the structural unit represented by the formula (1a) is greater than 0 mol %, preferably 30 mol % or greater, more preferably 50 mol % or greater and is preferably 90 mol % or less, more preferably 80 mol % or less.

The amount (t) of the structural unit represented by the formula (1b) is 0 mol % or greater, preferably 5 mol % or greater, more preferably 10 mol % or greater, still more preferably 20 mol % or greater and is preferably 50 mol % or less, more preferably 30 mol % or less. The amount (u) of the structural unit represented by the formula (1c) is 0 mol % or greater, preferably 10 mol % or greater, more preferably 20 mol % or greater and is preferably 50 mol % or less, more preferably 30 mol % or less. When the amounts of the structural units in the formulas (1a) to (1c) are within the ranges, the curable resin composition can further reduce the occurrence of voids and partial detachment between the composition and the support during high-temperature processing and be more easily separated upon separation from the adherend.

The structural unit represented by the formula (1a), the structural unit represented by the formula (1b), and the structural unit represented by the formula (1c) may have a block structure including block components in which the structural units are each arranged in series or a random structure in which the structural units are randomly arranged.

The method for producing the compound (1-II) containing a maleimide group and having an imide skeleton in a backbone repeating unit is not limited. For example, the compound (1-II) can be obtained by reacting a diamine compound and an aromatic acid anhydride to prepare an imide compound, and reacting a functional group in the imide compound with a compound containing a functional group reactive with the functional group of the imide compound and a maleimide group-containing group (hereinafter referred to as a functional group-containing maleimide compound). Alternatively, for example, the compound (1-II) can also be obtained by reacting a diamine compound and an aromatic acid anhydride to prepare an imide compound and reacting an end of the imide compound with, for example, maleic anhydride.

The diamine compound used may be an aliphatic diamine compound or an aromatic diamine compound.

Using an aliphatic diamine compound as the diamine compound allows an adhesive layer formed using the curable resin composition to exhibit high flexibility, and thus to exhibit high conformability to adherends with irregularities and be more easily separated upon separation. Using an aromatic diamine compound as the diamine compound further improves the heat resistance of the curable resin composition. Using a diamine compound containing a functional group as the diamine compound and reacting this functional group with the above functional group-containing maleimide compound can produce a compound (1-II) containing a maleimide group in a side chain.

These aliphatic diamine compounds, aromatic diamine compounds, and diamine compounds containing a functional group may be used alone or in combination of two or more thereof.

Examples of the aliphatic diamine compound include 1,10-diaminodecane, 1,12-diaminododecane, dimer diamine, 1,2-diamino-2-methylpropane, 1,2-diaminocyclohexane, 1,2-diaminopropane, 1,3-diaminopropane, 1,4-diaminobutane, 1,5-diaminopentane, 1,7-diaminoheptane, 1,8-diaminomentane, 1,8-diaminooctane, 1,9-diaminononane, 3,3'-diamino-N-methyldipropylamine, diaminomaleonitrile, 1,3-diaminopentane, bis(4-amino-3-methylcyclohexyl)methane, 1,2-bis(2-aminoethoxy)ethane, and 3(4),8(9)-bis(aminomethyl)tricyclo(5.2.1.02,6)decane.

Examples of the aromatic diamine compound include 9,10-diaminophenanthrene, 4,4'-diaminooctafluorobiphenyl, 3,7-diamino-2-methoxyfluorene, 4,4'-diaminobenzophenone, 3,4-diaminobenzophenone, 3,4-diaminotoluene, 2,6-diaminoanthraquinone, 2,6-diaminotoluene, 2,3-diaminotoluene, 1,8-diaminonaphthalene, 2,4-diaminotoluene, 2,5-diaminotoluene, 1,4-diaminoanthraquinone, 1,5-diaminoanthraquinone, 1,5-diaminonaphthalene, 1,2-diaminoanthraquinone, 2,4-cumenediamine, 1,3-bisaminomethylbenzene, 1,3-bisaminomethylcyclohexane, 2-chloro-1,4-diaminobenzene, 1,4-diamino-2,5-dichlorobenzene, 1,4-diamino-2,5-dimethylbenzene, 4,4'-diamino-2,2'-bistrifluoromethylbiphenyl, bis(amino-3-chlorophenyl)ethane, bis(4-amino-3,5-dimethylphenyl)methane, bis(4-amino-3,5-diethylphenyl)methane, bis(4-amino-3-ethyldiamino)fluorene, 2,3-diaminonaphthalene, 2,3-diaminophenol, -5-methylphenyl)methane, bis(4-amino-3-methylphenyl)methane, bis(4-amino-3-ethylphenyl)methane, 4,4'-diaminophenylsulfone, 3,3'-diaminophenylsulfone, 2,2-bis(4,(4-aminophenoxy)phenyl)sulfone, 2,2-bis(4-(3-aminophenoxy)phenyl)sulfone, 4,4'-oxydianiline, 4,4'-diaminodiphenylsulfide, 3,4'-oxydianiline, 2,2-bis(4-(4-aminophenoxy)phenyl)propane, 1,3-bis(4-aminophenoxy)benzene, 4,4'-bis(4-aminophenoxy)biphenyl, 4,4'-diamino-3,3'-dihydroxybiphenyl, 4,4'-diamino-3,3'-dimethylbiphenyl, 4,4'-diamino-3,3'-dimethoxybiphenyl, Bisaniline M, Bisaniline P, 9,9-bis(4-aminophenyl)fluorene, o-tolidine sulfone, methylene bis(anthranilic acid), 1,3-bis(4-aminophenoxy)-2,2-dimethylpropane, 1,3-bis(4-aminophenoxy)propane, 1,4-bis(4-aminophenoxy)butane, 1,5-bis(4-aminophenoxy)butane, 2,3,5,6-tetramethyl-1,4-phenylene diamine, 3,3',5,5'-tetramethylbenzidine, 4,4'-diaminobenzanilide, 2,2-bis(4-aminophenyl)hexafluoropropane, polyoxyalkylene diamines (e.g., Jeffamine D-230, D400, D-2000, and D-4000 produced by Huntsman), 1,3-cyclohexane bis(methylamine), m-xylylenediamine, and p-xylylenediamine.

In particular, as described above, aliphatic diamine compounds are preferred, and dimer diamines are more preferred to achieve higher flexibility and to allow the compound (1-II) containing a maleimide group and having an imide skeleton in a backbone repeating unit to have higher compatibility with solvents and other components to facilitate the formation of an adhesive layer.

Examples of the diamine compound containing a functional group include diamine compounds containing hydroxy groups, diamine compounds containing carboxy groups, and diamine compounds containing halogen groups.

Examples of the diamine compounds containing hydroxy groups include 1,3-diamino-2-propanol, 2,4-diaminophenoxyethanol, 3,5-diaminophenoxyethanol, 2,4-diaminophenol, 3,5-diaminophenol, 2,4-diaminobenzyl alcohol, 4,6-diaminoresorsin dihydrochloride, and 2,2-bis(3-amino-4-hydroxyphenyl)hexafluoropropane. Examples of the diamine compounds containing carboxy groups include 3,5-diaminobenzoic acid. Examples of the diamine compounds containing halogen groups include 2,4-diaminochlorobenzene.

Examples of the aromatic acid anhydride include pyromellitic acid, 1,2,5,6-naphthalenetetracarboxylic acid, 2,3,6,7-naphthalenetetracarboxylic acid, 1,2,4,5-naphthalenetetracarboxylic acid, 1,4,5,8-naphthalenetetracarboxylic acid, 3,3',4,4'-benzophenonetetracarboxylic acid, 3,3',4,4'-biphenylethertetracarboxylic acid, 3,3',4,4'-biphenyltetracarboxylic acid, 2,3,5,6-pyridinetetracarboxylic acid, 3,4,9,10-perylenetetracarboxylic acid, 4,4'-sulfonyldiphthalic acid, 1-trifluoromethyl-2,3,5,6-benzenetetracarboxylic acid, 2,2',3,3'-biphenyltetracarboxylic acid, 2,2-bis(3,4-dicarboxyphenyl)propane, 2,2-bis(2,3-dicarboxyphenyl)propane, 1,1-bis(2,3-dicarboxyphenyl)ethane, 1,1-bis(3,4-dicarboxyphenyl)ethane, bis(2,3-dicarboxyphenyl)methane, bis(3,4-dicarboxyphenyl)methane, bis(3,4-dicarboxyphenyl)sulfone, bis(3,4-dicarboxyphenyl)ether, benzene-1,2,3,4-tetracarboxylic acid, 2,3,2',3'-benzophenonetetracarboxylic acid, 2,3,3',4'-benzophenonetetracarboxylic acid, phenanthrene-1,8,9,10-tetracarboxylic acid, pyrazine-2,3,5,6-tetracarboxylic acid, thiophene-2,3,4,5-tetracarboxylic acid, 2,3,3',4'-biphenyltetracarboxylic acid, 3,4,3',4'-biphenyltetracarboxylic acid, 2,3,2',3'-biphenyltetracarboxylic acid, 4,4'-bis(3,4-dicarboxyphenoxy)diphenyl sulfide, and 4,4'-(4,4'-isopropylidenediphenoxy)-bis(phthalic acid).

The functional group-containing maleimide compound to be used is selected in accordance with the functional group at an end or in a side chain of the imide compound. For example, in the case where the functional group at an end or in a side chain of the imide compound is a hydroxy group, a carboxy group-containing maleimide compound may be used. Examples of the carboxy group-containing maleimide compound include maleimidoacetic acid, maleimidopropionic acid, maleimidobutyric acid, maleimidohexanoic acid, trans-4-(N-maleimidomethyl)cyclohexane-1-carboxylic acid, and 19-maleimido-17-oxo-4,7,10,13-tetraoxa-16-azanonadecanoic acid.

The amount of the maleimide group-containing reactive compound (1) is not limited. The lower limit of the amount thereof in 100 parts by weight of the total amount of the maleimide group-containing reactive compound (1) and the resin (2) having an imide skeleton in a backbone repeating unit is preferably 20 parts by weight. The upper limit thereof is preferably 80 parts by weight. When the amount of the maleimide group-containing reactive compound (1) is within this range, the curable resin composition is more easily separated upon separation from the adherend. To further increase the separability, the lower limit of the amount of the maleimide group-containing reactive compound (1) is more preferably 30 parts by weight, and the upper limit thereof is more preferably 70 parts by weight.

The resin (2) having an imide skeleton in a backbone repeating unit may be any resin that has an imide skeleton in a backbone repeating unit. The resin (2) preferably has a higher weight average molecular weight (Mw) than the compound (1-II) containing a maleimide group and having an imide skeleton in a backbone repeating unit. Specifically, the resin (2) having an imide skeleton in a backbone repeating unit preferably has a weight average molecular weight (Mw) of 20,000 or greater. When the resin (2) having an imide skeleton in a backbone repeating unit has a weight average molecular weight of 20,000 or greater, the curable resin composition can exhibit higher heat resistance. In other words, the curable resin composition can further reduce the occurrence of voids and partial detachment between the composition and the support during high-temperature processing, and also can further prevent a rise in adhesion to the adherend or the generation of adhesive deposits upon separation from the adherend. The weight average molecular weight of the resin (2) having an imide skeleton in a backbone repeating unit is more preferably 50,000 or greater. The upper limit of the weight average molecular weight of the resin (2) having an imide skeleton in a backbone repeating unit is not limited, but from the standpoint of the solubility in solvents, the upper limit is preferably 150,000, more preferably 100,000.

The resin (2) having an imide skeleton in a backbone repeating unit is preferably a resin (2-I) containing no maleimide group and having an imide skeleton in a backbone repeating unit.

Specific examples of the resin (2-I) containing no maleimide group and having an imide skeleton in a backbone repeating unit include a resin (2-i) containing a structural unit represented by the following formula (1d) and a structural unit represented by the following formula (1e), and having ends represented by $X^4$ and $X^5$.

[Chem. 3]

(1d)

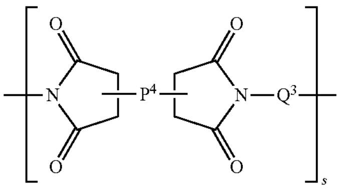

(1e)

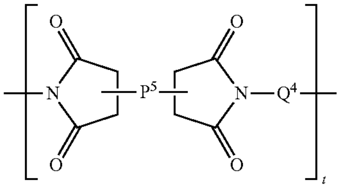

In the formulas (1d) and (1e), s>0 and t≥0 are satisfied; $P^4$ and $P^5$ each independently represent an aromatic group; $Q^3$ represents a substituted or unsubstituted linear, branched, or cyclic aliphatic group; $Q^4$ represents a substituted or unsubstituted aromatic structure-containing group; and $X^4$ and $X^5$ represent groups containing no maleimide group.

In the formulas (1d) and (1e), $P^4$ and $P^5$ are preferably C5-C50 aromatic groups. When $P^4$ and $P^5$ are C5-C50 aromatic groups, the curable resin composition can exhibit higher heat resistance. In other words, the curable resin composition can further reduce the occurrence of voids and partial detachment during high-temperature processing, and can also further prevent a rise in adhesion to the adherend or the generation of adhesive deposits upon separation from the adherend.

In the formula (1d), $Q^3$ is preferably a substituted or unsubstituted linear, branched, or cyclic C2-C100 aliphatic group. When $Q^3$ is a substituted or unsubstituted linear, branched, or cyclic C2-C100 aliphatic group, an adhesive layer formed using the curable resin composition can exhibit high flexibility, and thus can exhibit high conformability to adherends with irregularities and be more easily separated upon separation.

$Q^3$ is also preferably an aliphatic group derived from a diamine compound. The aliphatic group derived from a diamine compound may be the same as the above aliphatic group derived from a diamine compound for the bismaleimide compound (1-I) and the compound (1-II) containing a maleimide group and having an imide skeleton in a backbone repeating unit. In particular, $Q^3$ is preferably an aliphatic group derived from a dimer diamine to achieve higher flexibility and to allow the resin (2-I) containing no maleimide group and having an imide skeleton in a backbone repeating unit to have higher compatibility with solvents and other components to facilitate the formation of an adhesive layer. The aliphatic group derived from a dimer diamine also may be the same as the above aliphatic group derived from a dimer diamine for the bismaleimide compound (1-I) and the compound (1-II) containing a maleimide group and having an imide skeleton in a backbone repeating unit.

In other words, in the curable resin composition of the present invention, at least one selected from the group consisting of the maleimide group-containing reactive compound (1) and the resin (2) having an imide skeleton in a backbone repeating unit preferably contains an aliphatic group derived from a dimer diamine.

In the formula (1e), $Q^4$ is preferably a substituted or unsubstituted C5-C50 aromatic structure-containing group. When $Q^4$ is a substituted or unsubstituted C5-C50 aromatic structure-containing group, the curable resin composition can exhibit higher heat resistance. In other words, the curable resin composition can further reduce the occurrence of voids and partial detachment during high-temperature processing, and can also further prevent a rise in adhesion to the adherend or the generation of adhesive deposits upon separation from the adherend.

Examples of the groups containing no maleimide group represented by $X^4$ and $X^5$ include each independently aliphatic groups, alicyclic groups, aromatic groups, acid anhydrides, and amine compounds. Specific examples include a one-end-unreacted product of an acid anhydride that is a raw material of the resin (2-I) containing no maleimide group and having an imide skeleton in a backbone repeating unit and a one-end-unreacted product of a diamine compound that is a raw material of the resin (2-I). Alternatively, for example, the groups containing no maleimide group represented by $X^4$ and $X^5$ each may be a group containing a double bond-containing functional group such as a citraconimide group, a vinyl ether group, an allyl group, or a (meth)acrylic group.

In the formulas (1d) and (1e), s and t respectively correspond to the amounts (mol %) of the structural unit represented by the formula (1d) and the structural unit represented by the formula (1e) in the resin (2-I) containing no maleimide group and having an imide skeleton in a backbone repeating unit.

The amount (s) of the structural unit represented by the formula (1d) is greater than 0 mol %, preferably 30 mol % or greater, more preferably 50 mol % or greater and is preferably 90 mol % or less, more preferably 80 mol % or less.

The amount (t) of the structural unit represented by the formula (1e) is 0 mol % or greater, preferably 5 mol % or greater, more preferably 10 mol % or greater, still more preferably 20 mol % or greater and is preferably 50 mol % or less, more preferably 30 mol % or less. When the amounts of the structural units in the formulas (1d) and (1e) are within the ranges, the curable resin composition can further reduce the occurrence of voids and partial detachment between the composition and the support during high-temperature processing and be more easily separated upon separation from the adherend.

The structural unit represented by the formula (1d) and the structural unit represented by the formula (1e) may have a block structure including block components in which the structural units are each arranged in series or a random structure in which the structural units are randomly arranged.

The method for producing the resin (2) having an imide skeleton in a backbone repeating unit is not limited. For example, the resin (2) can be produced by reacting a diamine compound and an aromatic acid anhydride. The diamine compound and the aromatic acid anhydride may be the same as the above diamine compound and aromatic acid anhydride for the compound (1-II) containing a maleimide group and having an imide skeleton in a backbone repeating unit.

The amount of the resin (2) having an imide skeleton in a backbone repeating unit is not limited. The lower limit of the amount thereof in 100 parts by weight of the total amount of the maleimide group-containing reactive compound (1) and the resin (2) having an imide skeleton in a backbone repeating unit is preferably 20 parts by weight. The upper limit thereof is preferably 80 parts by weight. When the amount of the resin (2) having an imide skeleton in a backbone repeating unit is within this range, the curable resin composition can further reduce the occurrence of voids and partial detachment during high-temperature processing and be more easily separated upon separation from the adherend. To further reduce the occurrence of voids and partial detachment and further increase the separability, the lower limit of the amount of the resin (2) having an imide skeleton in a backbone repeating unit is more preferably 30 parts by weight, and the upper limit thereof is more preferably 70 parts by weight.

The curable resin composition of the present invention preferably further contains a silicone compound or a fluorine compound.

As silicone and fluorine compounds have excellent heat resistance, the curable resin composition is not likely to burn even after high-temperature processing at 300° C. or higher. Moreover, upon separation, the silicone or fluorine compound bleeds out to the interface with the adherend to further facilitate separation.

The silicone compound is not limited, and examples thereof include silicone oil, silicone diacrylate, and silicone-based graft copolymers. The fluorine compound is not limited, and examples thereof include fluorine atom-containing hydrocarbon compounds.

The silicone compound or fluorine compound preferably contains a functional group capable of crosslinking with the maleimide group-containing reactive compound (1) or the resin (2) having an imide skeleton in a backbone repeating unit, more preferably a functional group capable of crosslinking with a maleimide group.

The silicone compound or fluorine compound containing a functional group capable of crosslinking with a maleimide group chemically reacts with and is incorporated into the maleimide group-containing reactive compound (1) when heated or irradiated with light. The silicone compound or fluorine compound is thus less likely to attach to the adherend, thereby reducing contamination. The functional group capable of crosslinking with a maleimide group is not limited. Examples thereof include a radically polymerizable unsaturated bond (e.g., a vinyl group, a (meth)acryloyl group, an optionally substituted maleimide group).

In particular, a silicone compound containing a functional group capable of crosslinking with a maleimide group is favorable as it is environment-friendly and easily disposable.

The silicone compound containing a functional group capable of crosslinking with a maleimide group is preferably a silicone compound having a siloxane skeleton in the backbone and containing a double bond-containing functional group in a side chain or at an end.

The silicone compound having a siloxane skeleton in the backbone and a double bond-containing functional group in a side chain or at an end is not limited but preferably contains at least one selected from the group consisting of a silicone compound represented by the following formula (I), a silicone compound represented by the following formula (II), and a silicone compound represented by the following formula (III). These silicone compounds have particularly high heat resistance and high polarity and therefore easily bleed out from the curable resin composition.

[Chem. 4]

(I)

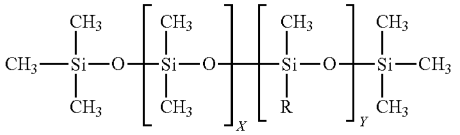

(II)

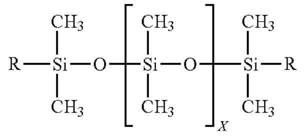

(III)

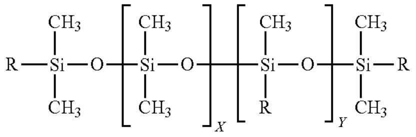

In the formulas (I), (II), and (III), X and Y each independently represent an integer of 0 to 1,200 and R represents a double bond-containing functional group.

Examples of the double bond-containing functional group for R in the formulas (I), (II), and (III) include an optionally substituted maleimide group, an optionally substituted citraconimide group, an optionally substituted vinyl ether group, an optionally substituted allyl group, and an optionally substituted (meth)acrylic group. For higher heat resistance, an optionally substituted maleimide group is favorable. In the case where multiple R's are present in the formulas (I), (II), and (III), the R's may be the same or different from each other.

Exemplary commercial products of the silicone compound represented by the formula (I), (II), or (III) include EBECRYL 350 and EBECRYL 1360 (both produced by Daicel-Cytec Co., Ltd.). Also included are BYK-UV3500 (produced by BYK-Chemie) and TEGO RAD2250 (produced by Evonik) (in these products, R represents an acrylic group).

The amount of the silicone compound or fluorine compound is not limited. The lower limit of the amount thereof relative to 100 parts by weight of the total amount of the maleimide group-containing reactive compound (1) and the resin (2) having an imide skeleton in a backbone repeating unit is preferably 0.1 parts by weight. The upper limit thereof is preferably 20 parts by weight. When the amount of the silicone compound or fluorine compound is within this range, the curable resin composition can exhibit excellent separability without contaminating the adherend. For achieving still higher separability while reducing contamination, the lower limit of the amount of the silicone compound or fluorine compound is more preferably 0.3 parts by weight, and the upper limit thereof is more preferably 10 parts by weight.

As the curable resin composition of the present invention has excellent heat resistance, a sufficient effect can be obtained even when the amount of the silicone compound or fluorine compound is relatively small.

Accordingly, the possibility of contamination by the silicone compound or fluorine compound can be further lowered.

The curable resin composition of the present invention preferably further contains a polymerization initiator. The polymerization initiator is not limited. It may be a thermal polymerization initiator or a photopolymerization initiator but is preferably a photopolymerization initiator.

The photopolymerization initiator used is, for example, activated by irradiation with light at a wavelength of 250 to 800 nm. In particular, the photopolymerization initiator preferably contains a photopolymerization initiator having a molar absorption coefficient at 405 nm of 1 or greater, because such a photopolymerization initiator is less likely to overlap in absorption wavelength with the maleimide group-containing reactive compound (1) and the resin (2) having an imide skeleton in a backbone repeating unit, and is sufficiently activated when the curable resin composition is irradiated with light. The photopolymerization initiator more preferably contains a photopolymerization initiator having a molar absorption coefficient at 405 nm of 200 or greater, still more preferably a photopolymerization initiator having a molar absorption coefficient at 405 nm of 350 or greater. The upper limit of the molar absorption coefficient at 405 nm of the photopolymerization initiator having a molar absorption coefficient at 405 nm of 1 or greater is not limited, but may be 2,000 or 1,500, for example.

Examples of the photopolymerization initiator include acetophenone derivative compounds such as methoxyacetopohenone, benzoin ether compounds such as benzoin propyl ether and benzoin isobutyl ether, ketal derivative compounds such as benzyl dimethyl ketal and acetophenone diethyl ketal, and phosphine oxide derivative compounds. Examples further include photoradical polymerization initiators such as bis(η5-cyclopentadienyl)titanocene derivative compounds, benzophenone, Michler's ketone, chlorothioxanthone, dodecylthioxanthone, dimethylthioxanthone, diethylthioxanthone, α-hydroxycyclohexyl phenyl ketone, and 2-hydroxymethyl phenyl propane. These photopolymerization initiators may be used alone or in combination of two or more thereof.

The amount of the polymerization initiator is not limited. The lower limit of the amount thereof relative to 100 parts by weight of the total amount of the maleimide group-containing reactive compound (1) and the resin (2) having an imide skeleton in a backbone repeating unit is preferably 0.1 parts by weight. The upper limit thereof is preferably 10 parts by weight. When the amount of the polymerization initiator is within this range, the curable resin composition as a whole can uniformly and quickly polymerize and crosslink when heated or irradiated with light. The resulting increase in the modulus of elasticity greatly decreases adhesion, preventing a rise in adhesion to the adherend or the generation of adhesive deposits upon separation from the adherend. The lower limit of the amount of the polymerization initiator is more preferably 0.3 parts by weight, and the upper limit thereof is more preferably 3 parts by weight.

The curable resin composition of the present invention may further contain a gas generating agent that generates gas when irradiated with light. The curable resin composition containing the gas generating agent generates gas when irradiated with light to discharge the gas to the interface with the adherend. Thus, the adherend can be more easily separated without adhesive deposits even after high-temperature processing at 300° C. or higher. In addition, even a thin adherend can be separated without damage thereto after high-temperature processing at 300° C. or higher.

The gas generating agent preferably has a weight loss rate at 300° C. of 5% or less when heated from 30° C. to 300° C. at a heating rate of 10° C./min in a nitrogen atmosphere in thermogravimetry-differential thermal analysis (TG-DTA) measurement. When the weight loss rate is 5% or less, the gas generating agent is less likely to decompose even in high-temperature processing at 300° C. or higher, and the curable resin composition can exhibit higher heat resistance. In other words, the curable resin composition can further reduce detachment during high-temperature processing and can further prevent a rise in adhesion or the generation of adhesive deposits upon separation.

The thermogravimetry-differential thermal analysis (TG-DTA) measurement can be performed using, for example, a TG-DTA device (STA7200RV, produced by Hitachi High-Tech Science Corporation, or its equivalent product).

Examples of the gas generating agent include gas generating agents that generate gas when heated and gas generating agents that generate gas when irradiated with light. These gas generating agents may be used alone or in combination of two or more thereof. Among these, gas generating agents that generate gas when irradiated with light are preferred, and gas generating agents that generate gas when irradiated with UV light are more preferred.

Examples of the gas generating agent include tetrazole compounds or salts thereof, triazole compounds or salts thereof, azo compounds, azide compounds, xanthone acetic acid, and carbonates. These gas generating agents may be used alone or in combination of two or more thereof. Among these, tetrazole compounds or salts thereof are favorable for their particularly high heat resistance.

The amount of the gas generating agent is not limited. The lower limit of the amount thereof relative to 100 parts by weight of the total amount of the maleimide group-containing reactive compound (1) and the resin (2) having an imide skeleton in a backbone repeating unit is preferably 5 parts by weight. The upper limit thereof is preferably 50 parts by weight. When the amount of the gas generating agent is within this range, the curable resin composition can exhibit particularly excellent separability. The lower limit of the amount of the gas generating agent is more preferably 8 parts by weight, and the upper limit thereof is more preferably 30 parts by weight.

The curable resin composition of the present invention may further contain an inorganic filler.

When containing the inorganic filler, the curable resin composition can further reduce detachment even during high-temperature processing at 300° C. or higher because the inorganic filler can reduce a decrease in the modulus of elasticity at high temperature.

The inorganic filler is not limited. The inorganic filler may be, for example, an inorganic filler formed of at least one selected from the group consisting of oxides of silicon, titanium, aluminum, calcium, boron, magnesium, and zirconia, and composites of these. Preferred among these are silica and talc, which are commercial products and inexpensively and easily available.

The inorganic filler may be surface-modified. Any modifying functional group may be used to surface-modify the inorganic filler. Examples thereof include an alkylsilane group, a methacryloyl group, and a dimethylsiloxane group. Preferred among these is a dimethylsiloxane group, which has appropriate hydrophobicity.

The average particle size of the inorganic filler is not limited. The lower limit thereof is preferably 5 nm, and the upper limit thereof is preferably 30 μm. When the average particle size of the inorganic filler is within this range, the curable resin composition can further reduce detachment during high-temperature processing and be separated by peel treatment upon separation. The lower limit of the average particle size of the inorganic filler is more preferably 10 nm, and the upper limit thereof is more preferably 20 μm. The lower limit is still more preferably 15 nm, and the upper limit is still more preferably 15 μm.

The average particle size is preferably a number average particle size. The average particle size can be measured by, for example, observing 50 random inorganic filler particles with an electron microscope or an optical microscope and calculating the average of the particle sizes of the inorganic filler particles, or by performing laser diffraction particle size distribution measurement.

The amount of the inorganic filler is not limited. The lower limit of the amount thereof relative to 100 parts by weight of the total amount of the maleimide group-containing reactive compound (1) and the resin (2) having an imide skeleton in a backbone repeating unit is preferably 1 part by weight. The upper limit thereof is preferably 20 parts by weight. When the amount of the inorganic filler is within this range, the curable resin composition can further reduce detachment during high-temperature processing and be separated by peel treatment upon separation. The lower limit of the amount of the inorganic filler is more preferably 3 parts by weight, and the upper limit thereof is more preferably 15 parts by weight. The lower limit is still more preferably 5 parts by weight, and the upper limit is still more preferably 10 parts by weight.

The curable resin composition of the present invention may contain, for example, known additives such as photosensitizers, thermal stabilizers, antioxidants, antistatic agents, plasticizers, resins, surfactants, and waxes.

The curable resin composition of the present invention preferably has a 5% weight loss temperature of 350° C. or higher. When the 5% weight loss temperature is 350° C. or higher, the curable resin composition can exhibit higher heat resistance. In other words, the curable resin composition can further reduce the occurrence of voids and partial detachment between the composition and the support during high-temperature processing, and also can further prevent a rise in adhesion to the adherend or the generation of adhesive deposits upon separation from the adherend. The 5% weight loss temperature is more preferably 380° C. or higher, still more preferably 400° C. or higher. The upper limit of the 5% weight loss temperature is not limited but is practically about 600° C.

The 5% weight loss temperature can be measured as follows.

The curable resin composition is cured and then weighed into an aluminum pan. The aluminum pan is set in the device. The measurement sample is heated from 25° C. at a heating rate of 10° C./min in a nitrogen atmosphere using a thermogravimetry device (STA7200 (produced by Hitachi High-Tech Science Corporation) or its equivalent product), and the temperature at which a 5% weight loss occurs is measured. The curing conditions are as follows. A photocurable resin composition can be cured by irradiation with UV light at 405 nm at an intensity of 20 mW/cm$^2$ for 150 seconds, for example. A thermosetting resin composition can be cured by heating in an oven at 150° C. for 10 minutes, for example.

The lower limit of the gel fraction after curing of an adhesive layer containing the curable resin composition of the present invention after being cured is preferably 70% by weight, and the upper limit thereof is preferably 95% by weight. When the gel fraction after curing is within the range, the curable resin composition is more easily separated upon separation from the adherend. The lower limit of the gel fraction after curing is more preferably 75% by weight, and the upper limit thereof is more preferably 90% by weight.

For the gel fraction after curing, a photocurable adhesive layer formed using the curable resin composition is cured by irradiation with UV light at 405 nm at an intensity of 20 mW/cm$^2$ for 150 seconds using an ultra-high pressure mercury lamp. A thermosetting adhesive layer is cured by heating at 150° C. for 10 minutes. The gel fraction is then measured by the following method.

The adhesive layer is cut into a flat rectangular specimen having a size of 50 mm×100 mm. The specimen is immersed in toluene at 23° C. for 24 hours, then taken out of the toluene, and dried at 110° C. for one hour. The weight of the dried specimen is measured, and the gel fraction is calculated using the following equation (1). No release film to protect the adhesive layer is stacked on the specimen.

$$\text{Gel fraction (\% by weight)} = 100\times(W_2 - W_0)/(W_1 - W_0) \quad (1)$$

($W_0$: the weight of the substrate, $W_1$: the weight of the specimen before immersion, $W_2$: the weight of the specimen after immersion and drying)

The curable resin composition of the present invention may be produced by any method. For example, it can be produced by mixing the maleimide group-containing reactive compound (1), the resin (2) having an imide skeleton in a backbone repeating unit, and optional additives using a device such as a bead mill, an ultrasonic disperser, a homogenizer, a high-power disperser, or a roll mill.

The present invention also encompasses a temporary fixing material including an adhesive layer containing the curable resin composition of the present invention. Such a temporary fixing material is referred to as a first temporary fixing material of the present invention.

When the curable resin composition of the present invention contains the gas generating agent, the present invention also encompasses a temporary fixing material including a first adhesive layer that contains the curable resin composition of the present invention containing the gas generating agent and a second adhesive layer. Such a temporary fixing material is referred to as a second temporary fixing material of the present invention.

In the second temporary fixing material of the present invention, the first adhesive layer contains the gas generating agent and is a curable adhesive layer capable of generating gas.

The lower limit of the gel fraction of the first adhesive layer after being cured is preferably 50% by weight. When the gel fraction after curing is within the range, the first adhesive layer is more easily separated upon separation. The lower limit of the gel fraction after curing is more preferably 80% by weight.

For the gel fraction after curing, a photocurable first adhesive layer is cured by irradiation with UV light at 405 nm at an intensity of 20 mW/cm$^2$ for 150 seconds using an ultra-high pressure mercury lamp. A thermosetting first adhesive layer is cured by heating at 150° C. for 10 minutes. The gel fraction is then measured by the following method.

The first adhesive layer is cut into a flat rectangular specimen having a size of 50 mm×100 mm. The specimen is immersed in toluene at 23° C. for 24 hours, then taken out of the toluene, and dried at 110° C. for one hour. The weight of the dried specimen is measured, and the gel fraction is calculated using the following equation (1). No release film to protect the first adhesive layer is stacked on the specimen.

$$\text{Gel fraction (\% by weight)} = 100\times(W_2 - W_0)/(W_1 - W_0) \quad (1)$$

($W_0$: the weight of the substrate, $W_1$: the weight of the specimen before immersion, $W_2$: the weight of the specimen after immersion and drying)

The first adhesive layer preferably has an adhesion to glass at 25° C. of 1.5 N/inch or less after being cured and heated at 300° C. for 10 minutes (heated and cooled). When the adhesion to glass is within the range, the first adhesive layer is more easily separated upon separation. The adhesion to glass is more preferably 1.2 N/inch or less, still more preferably 1.1 N/inch or less, further preferably 1.0 N/inch or less.

The adhesion to glass can be measured by the following method.

The first adhesive layer is heat-laminated onto quartz glass (produced by Matsunami Glass Ind., Ltd., Large white glass slide with polished edges No. 2 S9112) using a laminator (produced by Lami Corporation Inc., "Leon13DX", or its equivalent product) at 100° C. In heat lamination, the first adhesive layer is laminated onto the glass once at a temperature setting value of 100° C. and a speed setting value of 5. After heat lamination, the first adhesive layer is cured by irradiation with UV light at 405 nm at an intensity of 20 $mW/cm^2$ for 150 seconds using an ultra-high pressure mercury lamp, or by heating in an oven at 150° C. for 10 minutes. The first adhesive layer is then heated from the glass side on a hot plate at 300° C. for 10 minutes. The first adhesive layer after being cured and heated at 300° C. for 10 minutes is subjected to a 180° peel test in an environment at 25° C. and a relative humidity of 50% at a tensile speed of 300 mm/min, and the adhesion is measured.

The thickness of the first adhesive layer is not limited. The lower limit thereof is preferably 5 μm, and the upper limit thereof is preferably 550 μm. When the thickness is 5 μm or greater, the first adhesive layer can have sufficient initial pressure-sensitive or heat-sensitive adhesion. When the thickness is 550 μm or less, the first adhesive layer can exhibit high flexibility, and thus can exhibit high conformability to adherends with irregularities and be more easily separated upon separation. The lower limit of the thickness is more preferably 10 μm, still more preferably 20 μm, further preferably 30 μm. The upper limit of the thickness is more preferably 400 μm, still more preferably 300 μm, further preferably 200 μm, even further preferably 150 μm.

The second adhesive layer is not limited. The second adhesive layer used may be a curable adhesive layer having the same composition, physical properties, thickness, and the like as the first adhesive layer. In particular, the second adhesive layer is preferably a thermosetting adhesive layer. The second adhesive layer that is a thermosetting adhesive layer can be sufficiently cured by heating even when the substrate used has low light transmission, the first adhesive layer is a photocurable adhesive layer, and the temporary fixing material is irradiated with light from the first adhesive layer side.

The second adhesive layer may or may not contain the gas generating agent.

The first temporary fixing material of the present invention and the second temporary fixing material of the present invention may include the adhesive layer(s) containing the curable resin composition of the present invention on one or both surfaces of a substrate, or may not include a substrate.

The absence of the substrate eliminates the need for selecting a substrate having both light transmission and heat resistance, leading to a less expensive, simply structured temporary fixing material. In addition, when the first adhesive layer and the second adhesive layer in the second temporary fixing material of the present invention are both photocurable adhesive layers, the absence of the substrate allows sufficient light to reach the curable adhesive layer on the side opposite to the light irradiation side.

When the second temporary fixing material of the present invention includes the substrate, the first adhesive layer and the second adhesive layer are preferably stacked on one surface and an opposite surface of the substrate, respectively. In other words, the first adhesive layer, the substrate, and the second adhesive layer are preferably stacked in the stated order.

Examples of the substrate include sheets formed of transparent resins such as acrylic, olefin, polycarbonate, vinyl chloride, ABS, polyethylene terephthalate (PET), polyethylene naphthalate (PEN), nylon, urethane, and polyimide. The substrate may be a sheet having a mesh-like structure, a perforated sheet, or glass.

The thickness of the substrate is not limited. To increase the light transmission and the flexibility, the lower limit thereof is preferably 5 μm, and the upper limit thereof is preferably 150 μm. The lower limit is more preferably 10 μm, and the upper limit is more preferably 100 μm.

The temporary fixing materials of the present invention each preferably have an adhesion to glass at 25° C. of 1.5 N/inch or less after being cured and heated at 300° C. for 10 minutes (heated and left to cool). When the adhesion to glass is within the range, the temporary fixing material is more easily separated upon separation. The adhesion to glass is more preferably 1.2 N/inch or less, still more preferably 1.1 N/inch or less, further more preferably 1.0 N/inch or less.

The adhesion to glass is measured by the following method.

The temporary fixing material is heat-laminated onto glass (produced by Matsunami Glass Ind., Ltd., Large white glass slide with polished edges No. 2) using a laminator (produced by Lami Corporation Inc., Leon13DX) at 100° C. In heat lamination, the temporary fixing material is laminated onto the glass once at a temperature setting value of 100° C. and a speed setting value of 5. After heat lamination, the temporary fixing material is cured by irradiation from the glass side with UV light at 405 nm at an intensity of 20 $mW/cm^2$ for 150 seconds using an ultra-high pressure mercury lamp, or by heating in an oven at 150° C. for 10 minutes. The temporary fixing material is then heated from the glass side on a hot plate at 300° C. for 10 minutes. After heating, the temporary fixing material is left to cool to room temperature. The temporary fixing material after being cured and heated at 300° C. for 10 minutes is subjected to a 180° peel test in under the conditions of 25° C. at a tensile speed of 300 mm/min, and the adhesion is measured.

The curable resin composition of the present invention, the first temporary fixing material of the present invention, and the second temporary fixing material of the present invention have sufficient initial pressure-sensitive or heat-sensitive adhesion to reduce the occurrence of voids and partial detachment between them and the support during high-temperature processing. On the other hand, they can prevent a rise in adhesion to the adherend or the generation of adhesive deposits upon separation and can be easily separated upon separation from the adherend. Thus, the curable resin composition of the present invention, the first temporary fixing material of the present invention, and the second temporary fixing material of the present invention can be suitably used to protect and temporarily fix adherends to be subjected to high-temperature processing at 300° C. or higher, particularly polyimide resin adherends. In particular, for easier handling and less breakage of electronic components (e.g., semiconductors) during processing of electronic components, the curable resin composition or the temporary fixing materials may be suitably used to fix electronic components to supports, or the temporary fixing materials may be suitably bonded to electronic components to protect the components.

The present invention also encompasses a method for producing an electronic component, including: a temporary fixing step of temporarily fixing an electronic component to the first temporary fixing material of the present invention; a curing step of curing the adhesive layer of the first temporary fixing material of the present invention; a heat treatment step of heat-treating the electronic component; and a separation step of separating the electronic component from the first temporary fixing material of the present invention.

The curing step of curing the adhesive layer of the first temporary fixing material of the present invention may be performed immediately before the separation step of separating the electronic component from the temporary fixing material of the present invention. Preferably, the curing step is performed after the temporary fixing step of temporarily fixing the electronic component to the first temporary fixing material of the present invention but before the heat treatment step of heat-treating the electronic component. Performing the curing step of curing the adhesive layer of the first temporary fixing material of the present invention before the heat treatment step of heat-treating the electronic component allows the temporary fixing material to exhibit better heat resistance.

The present invention also encompasses a method for producing an electronic component using the second temporary fixing material of the present invention, the method including: a support bonding step of bonding the first adhesive layer of the temporary fixing material and a support; an adherend bonding step of bonding the second adhesive layer of the temporary fixing material and an electronic component; a curing step of curing the first adhesive layer and the second adhesive layer; a heat treatment step of heat-treating the electronic component; a gas generation step of generating gas from the first adhesive layer; and a separation step of separating the support and the temporary fixing material from each other.

The curing step may be performed immediately before the gas generation step. Preferably, the curing step is performed after the support bonding step and the adherend bonding step but before the heat treatment step. Performing the curing step before the heat treatment step allows the temporary fixing material to exhibit better heat resistance.

Examples of the support include glass substrates and quartz substrates. Examples of the adherend include silicon wafers.

Advantageous Effects of Invention

The present invention can provide a curable resin composition that can reduce the occurrence of voids and partial detachment between the composition and a support even in high-temperature processing at 300° C. or higher (e.g., heating at 300° C. to 450° C.) with an adherend and the support fixed with the composition, and is easily separable after the high-temperature processing. The present invention can also provide a temporary fixing material including an adhesive layer containing the curable resin composition and a method for producing an electronic component using the temporary fixing material.

DESCRIPTION OF EMBODIMENTS

Embodiments of the present invention are more specifically described in the following with reference to, but not limited to, examples.

(Preparation of Bismaleimide Compound (1-I))

A 500-mL round flask with a Teflon)(° stirrer placed therein was charged with 250 mL of toluene. Then, 56 g (0.1 mol) of dimer diamine (produced by Croda, Priamine 1075) and 19.6 g (0.2 mol) of maleic anhydride were added, and subsequently 5 g of methanesulfonic anhydride was added. The solution was refluxed for 12 hours and then cooled to room temperature. To the flask was added 300 mL of toluene, and the flask was allowed to stand still for removal of precipitated salt. The obtained solution was filtered through a glass frit funnel filled with silica gel, followed by removal of the solvent in vacuum. Thus, a brown, liquid bismaleimide compound (1-I) represented by the following formula (A) was obtained.

[Chem. 5]

(A)

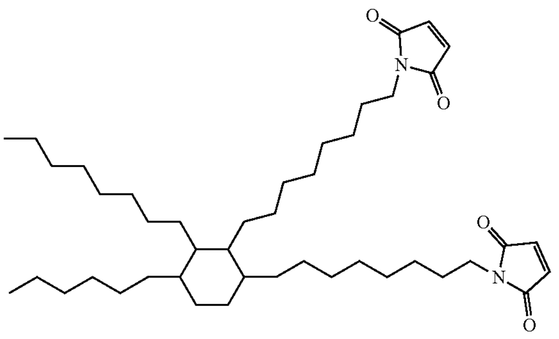

(Preparation of Compound (1-II) Containing Maleimide Group and Having Imide Skeleton in Backbone Repeating Unit)

A 500-mL round flask with a Teflon (®) stirrer placed therein was charged with 250 mL of toluene. Then, 35 g (0.35 mol) of triethylamine and 35 g (0.36 mol) of methanesulfonic anhydride were added, and the mixture was stirred to form salt. After stirring for 10 minutes, 56 g (0.1 mol) of dimer diamine (Produced by Croda, Priamine 1075) and 19.1 g (0.09 mol) of pyromellitic anhydride were added in this order. A Dean-Stark trap and a condenser were fitted to the flask and the mixture was refluxed for two hours for formation of amine-terminated diimide. After cooling to room temperature or lower, the reaction product was blended with 12.8 g (0.13 mol) of maleic anhydride and then with 5 g (0.05 mol) of methanesulfonic anhydride. The mixture was further refluxed for 12 hours and then cooled to room temperature. To the flask was added 300 mL of toluene, and the flask was allowed to stand still for removal of precipitated impurities. The obtained solution was filtered through a glass frit funnel filled with silica gel, followed by removal of the solvent in vacuum. Thus, an amber wax-like compound (1-II) represented by the following formula (B), containing maleimide groups at both ends and having an imide skeleton in a backbone repeating unit, was obtained.

The weight average molecular weight of the obtained compound was 5,000, as determined by gel permeation chromatography (GPC) in which the eluent used was THF and the column used was HR-MB-M (trade name, produced by Waters Corporation).

[Chem. 6]

(B)

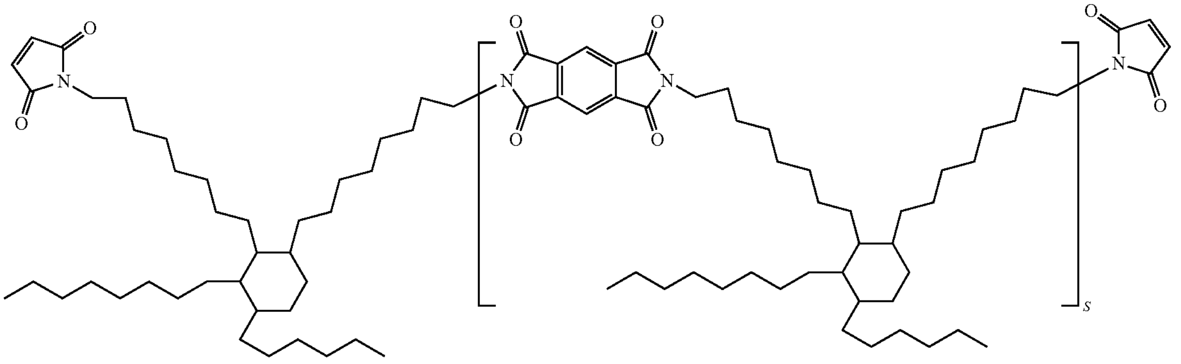

(Preparation of Resin (2-I) Containing No Maleimide Group and Having Imide Skeleton in Backbone Repeating Unit)

A 500-mL round flask with a Teflon (®) stirrer placed therein was charged with 250 mL of toluene. Then, 35 g (0.35 mol) of triethylamine and 35 g (0.36 mol) of methanesulfonic anhydride were added, and the mixture was stirred to form salt. After stirring for 10 minutes, 31.9 g (0.06 mol) of dimer diamine (Produced by Croda, Priamine 1075), 5.5 g (0.015 mol) of Bis-AP-AF, and 39 g (0.075 mol) of 4,4'-(4,4'-isopropylidenediphenoxy)diphthalic anhydride were added in this order. A Dean-Stark trap and a condenser were fitted to the flask and the mixture was refluxed for two hours and cooled to room temperature. To the flask was added 300 mL of toluene, and the flask was allowed to stand still for removal of precipitated impurities. The obtained solution was filtered through a glass frit funnel filled with silica gel, followed by removal of the solvent in vacuum. Thus, a brown, solid resin (2-I) represented by the following formula (C), containing no maleimide group and having an imide skeleton in a backbone repeating unit, was obtained.

The weight average molecular weight of the obtained resin was 72,000, as determined by gel permeation chromatography (GPC) in which the eluent used was THF and the column used was HR-MB-M (trade name, produced by Waters Corporation).

[Chem. 7]

(C)

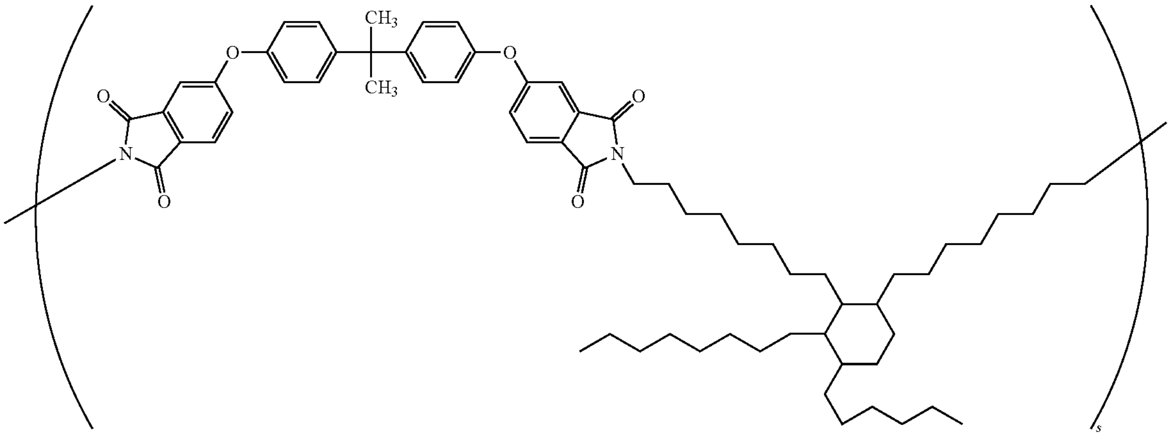

-continued

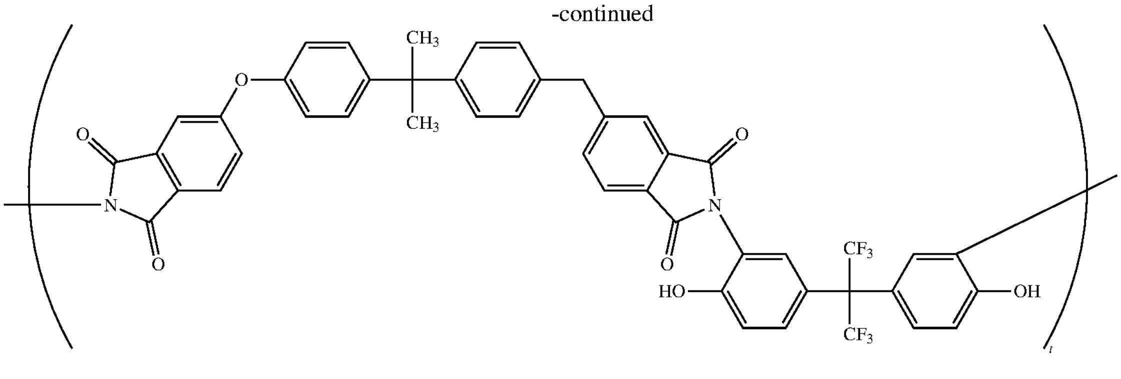

Preparation of Acrylic Reactive Resin

A reactor equipped with a thermometer, a stirrer, and a condenser was charged with 94 parts by weight of 2-ethylhexyl acrylate as a (meth)acrylic acid alkyl ester, 6 parts by weight of hydroxyethyl methacrylate as a functional group-containing monomer, 0.01 parts by weight of lauryl mercaptan, and 80 parts by weight of ethyl acetate. The reactor was then heated to initiate reflux. To the reactor was subsequently added 0.01 parts by weight of 1,1-bis(t-hexylperoxy)-3,3,5-trimethylcyclohexane as a polymerization initiator to initiate polymerization under reflux. Then, 0.01 parts by weight of 1,1-bis(t-hexylperoxy)-3,3,5-trimethylcyclohexane was added one hour after and two hours after the start of the polymerization. Four hours after the start of the polymerization, 0.05 parts by weight of t-hexyl peroxypivalate was added to continue the polymerization reaction. Eight hours after the start of the polymerization, an ethyl acetate solution of a functional group-containing (meth) acrylic polymer having a solid content of 55% by weight and a weight average molecular weight of 500,000 was obtained.

To 100 parts by weight of the resin solid content of the obtained ethyl acetate solution containing a functional group-containing (meth)acrylic polymer was added 3.5 parts by weight of 2-isocyanatoethyl methacrylate as a functional group-containing unsaturated compound and reacted. Thus, an acrylic reactive resin was obtained.

The weight average molecular weight of the obtained acrylic reactive resin was 550,000, as determined by gel permeation chromatography (GPC) in which the eluent used was THF and the column used was HR-MB-M (trade name, produced by Waters Corporation).

EXAMPLE 1

(1) Production of Temporary Fixing Material

To 150 mL of toluene were added 70 parts by weight of the compound (1-II) containing a maleimide group and having an imide skeleton in a backbone repeating unit and 30 parts by weight of the resin (2-I) containing no maleimide group and having an imide skeleton in a backbone repeating unit. Further, 5 parts by weight of bifunctional silicone acrylate (produced by Daicel-Allnex Ltd., EBECRYL 350) as a silicone compound and 2 parts by weight of Irgacure 819 (produced by BASF) as a photopolymerization initiator were added, whereby a toluene solution of a curable resin composition was prepared.

A 50-μm-thick PET film one surface of which was release-treated was provided. The obtained toluene solution of a curable resin composition was applied with a doctor knife to the release-treated surface to a dry film thickness of 40 μm, and the applied solution was dried by heating at 110° C. for five minutes. The dried film was allowed to stand still at 40° C. for three days. Thus, a temporary fixing material including an adhesive layer was obtained.

(2) Measurement of 5% Weight Loss Temperature

The adhesive layer of the obtained temporary fixing material was cured and then weighed into an aluminum pan. The aluminum pan was set in the device.

The measurement sample was heated from 25° C. to 500° C. at a heating rate of 10° C./min in a nitrogen atmosphere using a thermogravimetry device (STA7200, produced by Hitachi High-Tech Science Corporation), and the temperature at which a 5% weight loss occurred was measured. The adhesive layer was cured by irradiation with UV light at 405 nm at an intensity of 20 mW/cm$^2$ for 150 seconds, or by heating in an oven at 150° C. for 10 minutes instead of UV irradiation.

(3) Measurement of Gel Fraction After Curing

The adhesive layer of each obtained temporary fixing material was irradiated with UV light at 405 nm at an intensity of 20 mW/cm$^2$ for 150 seconds using an ultra-high pressure mercury lamp. The gel fraction was then measured by the following method.

The temporary fixing material was cut into a flat rectangular specimen having a size of 50 mm×100 mm. The specimen was immersed in toluene at 23° C. for 24 hours, then taken out of the toluene, and dried at 110° C. for one hour. The weight of the dried specimen was measured, and the gel fraction was calculated using the following equation (1). No release film to protect the adhesive layer was stacked on the specimen.

$$\text{Gel fraction (\% by weight)} = 100\times(W_2 - W_0)/(W_1 - W_0) \quad (1)$$

($W_0$: the weight of the substrate, $W_1$: the weight of the specimen before immersion, $W_2$: the weight of the specimen after immersion and drying)

In Example 18 described later, the first adhesive layer of the obtained temporary fixing material was irradiated with UV light at 405 nm at an intensity of 20 mW/cm$^2$ for 150 seconds to cure the first and second adhesive layers. The adhesive layers were then each weighed out and used as specimens. In Example 19 described later, the first and second adhesive layers were cured by heating in an oven at 150° C. for 10 minutes instead of UV irradiation. The adhesive layers were then each weighed out and used as specimens. As these specimens included no substrate, $W_0$ was 0.

EXAMPLES 2 TO 11 AND COMPARATIVE EXAMPLES 1 TO 4

A curable resin composition and a temporary fixing material were obtained as in Example 1 except that the composition of the curable resin composition was changed as shown in Table 1. The materials used were as follows.

Fluorine compound (photoreactive fluorine compound, produced by DIC Corporation, MEGAFACE RS-56)

Gas generating agent (5,5'-Bi-1H-tetrazole disodium salt (BHT-2Na))

EXAMPLES 12 TO 17

A curable resin composition and a temporary fixing material were obtained as in Example 1 except that the composition of the curable resin composition was changed as shown in Table 2. The materials used were as follows.

Inorganic filler (silica particles, produced by Tokuyama Corporation, MT-10, average particle size 15 nm)

Inorganic filler (silica particles, produced by Tatsumori Ltd., 5×, average particle size 1 μm)

EXAMPLE 18

(1) Formation of First Adhesive Layer (Gas Generating Agent-Containing Curable Adhesive Layer)

To 300 mL of toluene were added 100 parts by weight of the reactive resins shown in Table 3, 30 parts by weight of 5,5'-Bi-1H-tetrazole disodium salt (BHT-2Na) as a gas generating agent, 5 parts by weight of EBECRYL 350 as a silicone compound, and 3 parts by weight of Irgacure 369 (produced by BASF) as a photopolymerization initiator. Thus, a toluene solution of a curable resin composition in which 5,5'-Bi-1H-tetrazole disodium salt (BHT-2Na) was dispersed was prepared.

A 50-μm-thick polyethylene terephthalate film having a release-treated surface was provided as a separator. The obtained toluene solution of a curable resin composition was applied with a doctor knife to the film to a dry film thickness of 50 μm. The applied solution was dried by heating for 10 minutes in an oven preheated to 110° C. Thus, a first adhesive layer (gas generating agent-containing curable adhesive layer) was obtained.

(2) Formation of Second Adhesive Layer

To 300 mL of toluene were added 100 parts by weight of the reactive resins shown in Table 3, 5 parts by weight of EBECRYL 350 as a silicone compound, and 3 parts by weight of Irgacure 369 (produced by BASF) as a photopolymerization initiator. Thus, a toluene solution of a curable resin composition was prepared.

A 50-μm-thick polyethylene terephthalate film having a release-treated surface was provided as a separator. The obtained toluene solution of a curable resin composition was applied with a doctor knife to the film to a dry film thickness of 50 μm. The applied solution was dried by heating for 10 minutes in an oven preheated to 110° C. Thus, a second adhesive layer was obtained.

(3) Production of Temporary Fixing Material

The adhesive layer surfaces of the first adhesive layer (gas generating agent-containing curable adhesive layer) and the second adhesive layer were laminated, whereby a temporary fixing material in which both surfaces were covered with separators were obtained.

EXAMPLE 19

A curable resin composition and a temporary fixing material were obtained as in Example 1 except that the composition of the curable resin composition was changed as shown in Table 3 and a substrate was used as described below.

Specifically, in the formation of the second adhesive layer, a 25-μm-thick polyimide film (produced by Ube Industries, Ltd., Kapton film) one surface of which was corona-treated was provided, and the obtained toluene solution of a curable resin composition was applied with a doctor knife to the corona-treated surface to a dry film thickness of 50 μm. The applied solution was dried by heating for 10 minutes in an oven preheated to 110° C. After drying, a 50-μm-thick polyethylene terephthalate film having a release-treated surface, provided as a separator, was laminated on the adhesive layer surface opposite from the Kapton film. Thus, a second adhesive layer was obtained. The polymerization initiator used was PERBUTYL 0 produced by NOF Corporation.

<Evaluation>

The temporary fixing materials obtained in the examples and the comparative examples were evaluated by the following methods. Tables 1 to 3 show the results.

(1) Evaluation of Voids and Partial Detachment

Each obtained temporary fixing material was cut into a width of 1 inch and then heat-laminated onto a glass plate (produced by Matsunami Glass Ind., Ltd., Large white glass slide with polished edges No. 2) using a heat laminator (Leon13DX) at 100° C. with the speed set at 3 on the scale. In Examples 18 and 19, the second adhesive layer side was heat-laminated onto the glass plate.

After lamination, the temporary fixing material was irradiated from the glass side with UV light at 405 nm at an intensity of 20 mW/cm$^2$ for 150 seconds using an ultra-high pressure mercury lamp. In Example 19, the first and second adhesive layers were cured by heating in an oven at 150° C. for 10 minutes instead of UV irradiation. After curing, the release PET film of the temporary fixing material was removed, followed by heating from the glass side on a hot plate at 300° C. for 10 minutes.

The appearance of the temporary fixing material after being cured and heated at 300° C. was visually observed and evaluated in accordance with the following criteria.

○ (Good): No void or partial detachment was observed between the temporary fixing material and the glass plate.

x (Poor): A fine void was observed between the temporary fixing material and the glass plate, or partial detachment was observed in some portion(s) between the temporary fixing material and the glass plate.

(2) Evaluation of Separability After Curing and Heating at 300° C. for 10 Minutes Each obtained temporary fixing material was cut into a width of 1 inch and then heat-laminated onto a wafer having a photosensitive polyimide film using a laminator at 100° C. In Examples 18 and 19, the second adhesive layer side was heat-laminated onto the wafer.

After lamination, the temporary fixing material was irradiated from the temporary fixing material side with UV light at 405 nm at an intensity of 20 mW/cm$^2$ for 150 seconds using an ultra-high pressure mercury lamp. In Example 19, the first and second adhesive layers were cured by heating in an oven at 150° C. for 10 minutes instead of UV irradiation. After curing, the release PET film of the temporary fixing material was removed, and the side having the wafer having a photosensitive polyimide film was heated on a hot plate at 300° C. for 10 minutes.

The temporary fixing material after being cured and heated at 300° C. was subjected to a 180° peel test under the conditions of 25° C. and a tensile speed of 300 mm/min. A surface of the wafer having a photosensitive polyimide film after separation of the temporary fixing material was observed and evaluated in accordance with the following criteria.

○ (Good): No adhesive deposits were observed.

x (Poor): No adhesive deposits were observed but the separated surface was clouded.

xx (Very poor): Adhesive deposits were observed.

(3) Measurement of Adhesion to Glass at 25° C. After Curing and Heating at 300° C. for 10 Minutes Each obtained temporary fixing material was cut into a width of 1 inch and then heat-laminated onto a 1-mm-thick glass (produced by Matsunami Glass Ind., Ltd., Large white glass slide with polished edges No. 2) using a laminator (produced by Lami Corporation Inc., Leon13DX, speed 5 on the scale) at 100° C. After lamination, the temporary fixing material was irradiated from the glass side with UV light at 405 nm at an intensity of 20 $mW/cm^2$ for 150 seconds using an ultra-high pressure mercury lamp. In Example 19, the first and second adhesive layers were cured by heating in an oven at 150° C. for 10 minutes instead of UV irradiation. After curing, the release PET film of the temporary fixing material was removed, followed by heating from the glass side on a hot plate at 300° C. for 10 minutes.

The temporary fixing material after being cured, heated at 300° C. for 10 minutes, and left to cool was subjected to a 180° peel test under the conditions of 25° C. and a tensile speed of 300 mm/min.

In Examples 18 and 19, the measurement was performed on the surface of the first adhesive layer and the surface of the second adhesive layer separately. For the adhesion of the first adhesive layer to glass, the temporary fixing material after being heated at 300° C. for 10 minutes and left to cool was irradiated from the glass side with UV light at 254 nm at an intensity of 20 $mW/cm^2$ for 180 seconds using a high pressure mercury lamp so that gas was generated. The 180° peel test was then performed under the conditions of 25° C. and a tensile speed of 300 mm/min.

The adhesion was unmeasurable in Comparative Examples 1, 2, and 4 because voids or partial detachment occurred between the temporary fixing material and the glass plate after heating at 300° C. for 10 minutes. The adhesion could not be measured in Comparative Example 3 because the temporary fixing material was firmly adhered to the glass plate after heating at 300° C. for 10 minutes.

(4) Evaluation of Detachment and Separability After Curing and Heating at 300° C. for 20 Minutes The temporary fixing materials obtained in Examples 2 to 4 and 12 to 17 were further evaluated as follows.

Each obtained temporary fixing material was cut into a width of 1 inch and then heat-laminated onto a 1-mm-thick glass using a heat laminator (Leon13DX) at 100° C. with the speed set at 3 on the scale. After lamination, the temporary fixing material was irradiated from the glass side with UV light at 405 nm at an intensity of 20 $mW/cm^2$ for 150 seconds using an ultra-high pressure mercury lamp. After curing, the release PET film was removed, followed by heating from the glass side on a hot plate at 300° C. for 20 minutes. This test was performed five times.

The appearance of the temporary fixing material after being cured and heated at 300° C. for 20 minutes was visually observed and evaluated in accordance with the following criteria.

Detachment observed: No detachment was observed between the temporary fixing material and the glass in any of the five tests.

No detachment observed: Partial detachment was observed in some portion(s) between the temporary fixing material and the glass plate in one or more of the five tests.

The temporary fixing material after being cured and heated at 300° C. for 20 minutes was subjected to a 180° peel test under the conditions of 25° C. and a tensile speed of 300 mm/min. This test was performed five times. The peelability of the temporary fixing material was evaluated in accordance with the following criteria. The temporary fixing materials in which partial detachment occurred ("Detachment observed") in the above detachment test were not evaluated.

○○ (Excellent): Separable in all the five tests.

○ (Good): Separable in one to four tests.

x (Poor): Not separable in all the five tests.

TABLE 1

| | | | Example | | | | | | | |
|---|---|---|---|---|---|---|---|---|---|---|
| | | | 1 | 2 | 3 | 4 | 5 | 6 | 7 | 8 |
| Curable resin composition (parts by weight) | Maleimide group-containing reactive compound (1) | Bismaleimide compound (1-I) | — | 30 | — | 25 | 20 | — | — | — |
| | | Compound (1-II) containing maleimide group and having imide skeleton in backbone repeating unit | 70 | — | 30 | 25 | — | 80 | 70 | 70 |
| | Resin (2) having imide skeleton in backbone repeating unit | Resin (2-I) containing no maleimide group and having imide skeleton in backbone repeating unit | 30 | 70 | 70 | 50 | 80 | 20 | 30 | 30 |
| | Other reactive resin (acrylic reactive resin) | | — | — | — | — | — | — | — | — |
| | Silicone compound | EBECRYL 350 | 5 | 5 | 5 | 5 | 5 | 5 | 1 | — |
| | Fluorine compound | MEGAFACE | — | — | — | — | — | — | — | 5 |
| | Gas generating agent | BHT-2Na | — | — | — | — | — | — | — | — |
| | Photopolymerization initiator | Irgacure 819 | 2 | 2 | 2 | 2 | 2 | 2 | 2 | 2 |
| Physical properties | 5% Weight loss temperature (° C.) | | 422 | 422 | 426 | 420 | 423 | 430 | 425 | 423 |
| | Gel fraction after curing (% by weight) | | 87 | 82 | 80 | 85 | 81 | 88 | 86 | 86 |
| Evaluation | Voids/partial detachment | | ○ | ○ | ○ | ○ | ○ | ○ | ○ | ○ |
| | Separability after curing and heating at 300° C. for 10 minutes | | ○ | ○ | ○ | ○ | ○ | ○ | ○ | ○ |
| | Adhesion to glass at 25° C. after curing and heating at 300° C. for 10 minutes (N/inch) | | 0.1 | 0.2 | 0.2 | 0.2 | 0.2 | 0.1 | 0.3 | 0.1 |

TABLE 1-continued

| | | | Example | | | Comparative Example | | | |
|---|---|---|---|---|---|---|---|---|---|
| | | | 9 | 10 | 11 | 1 | 2 | 3 | 4 |
| Curable resin composition (parts by weight) | Maleimide group-containing reactive compound (1) | Bismaleimide compound (1-I) | — | — | 30 | — | 100 | — | — |
| | | Compound (1-II) containing maleimide group and having imide skeleton in backbone repeating unit | 70 | 70 | — | 100 | — | — | 70 |
| | Resin (2) having imide skeleton in backbone repeating unit | Resin (2-I) containing no maleimide group and having imide skeleton in backbone repeating unit | 30 | 30 | 70 | — | — | 100 | — |
| | Other reactive resin (acrylic reactive resin) | | — | — | — | — | — | — | 30 |
| | Silicone compound | EBECRYL 350 | 5 | 5 | 5 | 5 | 5 | 5 | 5 |
| | Fluorine compound | MEGAFACE | — | — | — | — | — | — | — |
| | Gas generating agent | BHT-2Na | 5 | 50 | 30 | — | — | — | — |
| | Photopolymerization initiator | Irgacure 819 | 2 | 2 | 2 | 2 | 2 | 2 | 2 |
| Physical properties Evaluation | 5% Weight loss temperature (° C.) | | 423 | 424 | 421 | 425 | 411 | 426 | 393 |
| | Gel fraction after curing (% by weight) | | 85 | 84 | 82 | 85 | 84 | 0 | 90 |
| | Voids/partial detachment | | ○ | ○ | ○ | x | x | ○ | x |
| | Separability after curing and heating at 300° C. for 10 minutes | | ○ | ○ | ○ | ○ | ○ | x | xx |
| | Adhesion to glass at 25° C. after curing and heating at 300° C. for 10 minutes (N/inch) | | 0.2 | 0.2 | 0.1 | Not measurable | Not measurable | Firmly adhered | Not measurable |

TABLE 2

| | | | Example | | | | |
|---|---|---|---|---|---|---|---|
| | | | 2 | 3 | 4 | 12 | 13 |
| Curable resin composition (parts by weight) | Maleimide group-containing reactive compound (1) | Bismaleimide compound (1-I) | 30 | — | 25 | 30 | 30 |
| | | Compound (1-II) containing maleimide group and having imide skeleton in backbone repeating unit | — | 30 | 25 | — | — |
| | Resin (2) having imide skeleton in backbone repeating unit | Resin (2-I) containing no maleimide group and having imide skeleton in backbone repeating unit | 70 | 70 | 50 | 70 | 70 |
| | Other reactive resin (acrylic reactive resin) | | — | — | — | — | — |
| | Silicone compound | EBECRYL 350 | 5 | 5 | 5 | 5 | 5 |
| | Fluorine compound | MEGAFACE | — | — | — | — | — |
| | Inorganic filler | MT-10 (15 nm) | — | — | — | 1 | 5 |
| | | 5X (1 μm) | — | — | — | — | — |
| | Photopolymerization initiator | Irgacure 819 | 2 | 2 | 2 | 2 | 2 |
| Physical properties Evaluation | 5% Weight loss temperature (° C.) | | 422 | 426 | 420 | 422 | 428 |
| | Gel fraction after curing (% by weight) | | 82 | 80 | 85 | 82 | 82 |
| | Voids/partial detachment | | ○ | ○ | ○ | ○ | ○ |
| | Separability after curing and heating at 300° C. for 10 minutes | | ○ | ○ | ○ | ○ | ○ |
| | Adhesion to glass at 25° C. after curing and heating at 300° C. for 10 minutes (N/inch) | | 0.2 | 0.2 | 0.2 | 0.2 | 0.3 |
| | After curing and heating at 300° C. for 20 minutes | Detachment after heating | Detachment observed | Detachment observed | Detachment observed | No detachment observed | No detachment observed |
| | | Separability | — | — | — | ○ | ○ |

TABLE 2-continued

| | | | Example 14 | Example 15 | Example 16 | Example 17 |
|---|---|---|---|---|---|---|
| Curable resin composition (parts by weight) | Maleimide group-containing reactive compound (1) | Bismaleimide compound (1-I) | 30 | | 30 | 25 |
| | | Compound (1-II) containing maleimide group and having imide skeleton in backbone repeating unit | — | 30 | — | 25 |
| | Resin (2) having imide skeleton in backbone repeating unit | Resin (2-I) containing no maleimide group and having imide skeleton in backbone repeating unit | 70 | 70 | 70 | 50 |
| | Other reactive resin (acrylic reactive resin) | | — | — | — | — |
| | Silicone compound | EBECRYL 350 | 5 | — | 5 | 5 |
| | Fluorine compound | MEGAFACE | — | 5 | — | |
| | Inorganic filler | MT-10 (15 nm) | 15 | 1 | — | 5 |
| | | 5X (1 μm) | — | — | 5 | — |
| | Photopolymerization initiator | Irgacure 819 | 2 | 2 | 2 | 2 |
| Physical properties Evaluation | 5% Weight loss temperature (° C.) | | 432 | 435 | 428 | 422 |
| | Gel fraction after curing (% by weight) | | 81 | 80 | 82 | 85 |
| | Voids/partial detachment | | ○ | ○ | ○ | ○ |
| | Separability after curing and heating at 300° C. for 10 minutes | | ○ | ○ | ○ | ○ |
| | Adhesion to glass at 25° C. after curing and heating at 300° C. for 10 minutes (N/inch) | | 0.6 | 0.2 | 0.5 | 0.2 |
| | After curing and heating at 300° C. for 20 minutes | Detachment after heating | No detachment observed | No detachment observed | No detachment observed | No detachment observed |
| | | Separability | ○ | ○ | ○ | ○ |

TABLE 3

| | | | | Example 18 | Example 19 |
|---|---|---|---|---|---|
| First adhesive layer | Curable resin composition (parts by weight) | Maleimide group-containing reactive compound (1) | Bis maleimide compound (1-1) | 25 | 25 |
| | | | Compound (1-II) containing maleimide group and having imide skeleton in backbone repeating unit | 25 | 25 |
| | | Resin (2) having imide skeleton in backbone repeating unit | Resin (2-I) containing no maleimide group and having imide skeleton in backbone repeating unit | 50 | 50 |
| | | Gas generating agent | BHT-2Na | 30 | 30 |
| | | Polymerization initiator | Irgacure 369 | 3 | — |
| | | | PERBUTYL O | — | 5 |
| | Thickness (μm) | | | 50 | 50 |
| | Substrate | | | None | Kapton film |
| Second adhesive layer | Curable resin composition (parts by weight) | Maleimide group-containing reactive compound (1) | Bismaleimide compound (1-I) | 25 | 25 |
| | | | Compound (1-II) containing maleimide group and having imide skeleton in backbone repeating unit | 25 | 25 |
| | | Resin (2) having imide skeleton in backbone repeating unit | Resin (2-I) containing no maleimide group and having imide skeleton in backbone repeating unit | 50 | 50 |
| | | Polymerization initiator | Irgacure 369 | 3 | — |
| | | | PERBUTYL O | — | 5 |
| | Thickness (μm) | | | 50 | 50 |
| Physical properties | First adhesive layer | 5% Weight loss temperature (° C.) | | 424 | 423 |
| | | Gel fraction after curing (% by weight) | | 85 | 88 |
| | Second adhesive layer | 5% Weight loss temperature (° C.) | | 422 | 420 |
| | | Gel fraction after curing (% by weight) | | 85 | 85 |
| Eval-uation | Voids/partial detachment | | | ○ | ○ |
| | Separability after curing and heating at 300° C. for 10 minutes | | | ○ | ○ |
| | Adhesion to glass at 25° C. after curing and heating at 300° C. for 10 minutes (N/inch) | | First adhesive layer | 0.05 | 0.1 |
| | | | Second adhesive layer | 0.7 | 0.7 |

INDUSTRIAL APPLICABILITY

The present invention can provide a curable resin composition that can reduce the occurrence of voids and partial detachment between the composition and a support even in high-temperature processing at 300° C. or higher with an adherend fixed to the support with the composition, and is easily separable after the high-temperature processing. The present invention can also provide a temporary fixing material including an adhesive layer containing the curable resin composition and a method of producing an electronic component using the temporary fixing material.

The invention claimed is:

1. A curable resin composition comprising:

a maleimide group-containing reactive compound (1);

a resin (2) having an imide skeleton in a backbone repeating unit; and wherein the resin (2) having an imide skeleton in a backbone repeating unit is a resin (2-I) containing no maleimide group and having an imide skeleton in a backbone repeating unit.

2. The curable resin composition according to claim 1, having a 5% weight loss temperature of 350° C. or higher.

3. The curable resin composition according to claim 1, wherein at least one selected from the group consisting of the maleimide group-containing reactive compound (1) and the resin (2) having an imide skeleton in a backbone repeating unit contains an aliphatic group derived from a dimer diamine.

4. The curable resin composition according to claim 1, wherein the maleimide group-containing reactive compound (1) is a bismaleimide compound (1-I) or a compound (1-II) containing a maleimide group and having an imide skeleton in a backbone repeating unit.

5. The curable resin composition according to claim 4, wherein the bismaleimide compound (1-1) is a compound containing two maleimide groups and an aliphatic group derived from a dimer diamine, and the aliphatic group derived from a dimer diamine is at least one selected from the group consisting of a group represented by the following formula (4-1), a group represented by the following formula (4-2), a group represented by the following formula (4-3), and a group represented by the following formula (4-4):

[Chem. 1]

(4-1)

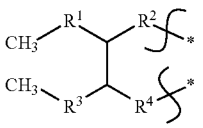

(4-2)

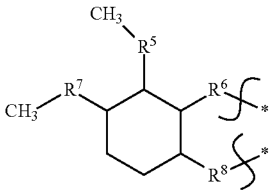

(4-3)

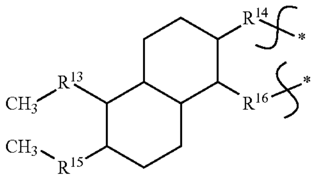

-continued (4-4)

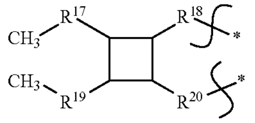

wherein $R^1$ to $R^8$ and $R^{13}$ to $R^{20}$ each independently represent a linear or branched hydrocarbon group.

6. The curable resin composition according to claim 4, wherein the compound (1-II) containing a maleimide group and having an imide skeleton in a backbone repeating unit is a compound (1-ii) containing a structural unit represented by the following formula (1a), a structural unit represented by the following formula (1b), and a structural unit represented by the following formula (1c), and having ends represented by $X^1$ and $X^2$:

[Chem. 2]

(1a)

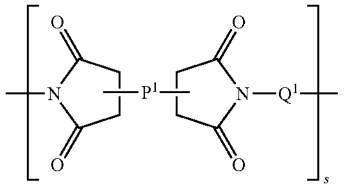

(1b)

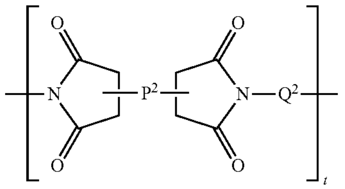

(1c)

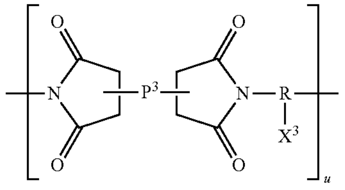

wherein s>0, t≥0, and u≥0 are satisfied; $P^1$, $P^2$, and $P^3$ each independently represent an aromatic group; $Q^1$ represents a substituted or unsubstituted linear, branched, or cyclic aliphatic group; $Q^2$ represents a substituted or unsubstituted aromatic structure-containing group, R represents a substituted or unsubstituted branched aliphatic or aromatic group; and at least one selected from the group consisting of $X^1$, $X^2$, and $X^3$ represents a maleimide group-containing group.

7. The curable resin composition according to claim 1, wherein the resin (2-I) containing no maleimide group and having an imide skeleton in a backbone repeating unit is a resin (2-i) containing a structural unit represented by the following formula (1d) and a structural unit represented by the following formula (1e), and having ends represented by $X^4$ and $X^5$:

[Chem. 3]

(1d)

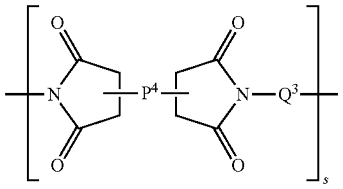

(1e)

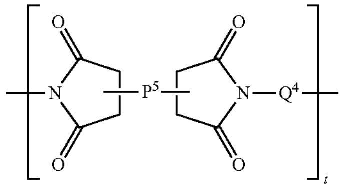

wherein $s>0$ and $t \geq 0$ are satisfied; $P^4$ and $P^5$ each independently represent an aromatic group; $Q^3$ represents a substituted or unsubstituted linear, branched, or cyclic aliphatic group; $Q^4$ represents a substituted or unsubstituted aromatic structure-containing group; and $X^4$ and $X^5$ represents groups containing no maleimide group.

8. The curable resin composition according to claim 1, wherein the resin (2) having an imide skeleton in a backbone repeating unit has a weight average molecular weight (Mw) of 20,000 or greater.

9. The curable resin composition according to claim 1, wherein the amount of the resin (2) having an imide skeleton in a backbone repeating unit is 20 parts by weight or greater and 80 parts by weight or less in 100 parts by weight of the total amount of the maleimide group-containing reactive compound (1) and the resin (2) having an imide skeleton in a backbone repeating unit.

10. The curable resin composition according to claim 1, wherein the amount of the maleimide group-containing reactive compound (1) is 20 parts by weight or greater and 80 parts by weight or less in 100 parts by weight of the total amount of the maleimide group-containing reactive compound (1) and the resin (2) having an imide skeleton in a backbone repeating unit.

11. The curable resin composition according to claim 1, further comprising a polymerization initiator.

12. The curable resin composition according to claim 11, wherein the polymerization initiator is a photopolymerization initiator, and the photopolymerization initiator contains a photopolymerization initiator having a molar absorption coefficient at 405 nm of 1 or greater.

13. The curable resin composition according to claim 1, further comprising a silicone compound or a fluorine compound.

14. The curable resin composition according to claim 1, further comprising an inorganic filler.

15. The curable resin composition according to claim 14, wherein the inorganic filler has an average particle size of 5 nm or greater and 20 μm or less.

16. The curable resin composition according to claim 14, wherein the amount of the inorganic filler is 1 part by weight or greater and 20 parts by weight or less in 100 parts by weight of the total amount of the maleimide group-containing reactive compound (1) and the resin (2) having an imide skeleton in a backbone repeating unit.

17. The curable resin composition according to claim 1, further comprising a gas generating agent.

18. The curable resin composition according to claim 17, wherein the gas generating agent has a weight loss rate at 300° C. of 5% or less when heated from 30° C. to 300° C. at a heating rate of 10° C./min in a nitrogen atmosphere in thermogravimetry-differential thermal analysis (TG-DTA) measurement.

19. A temporary fixing material comprising an adhesive layer containing the curable resin composition according to claim 1.

20. A temporary fixing material comprising:

a first adhesive layer containing the curable resin composition according to claim 17; and a second adhesive layer.

21. The temporary fixing material according to claim 20, wherein the first adhesive layer has a gel fraction of 50% by weight or more after being cured.

22. The temporary fixing material according to claim 20, further comprising a substrate, wherein the first adhesive layer and the second adhesive layer are stacked on one surface and an opposite surface of the substrate, respectively.

23. The temporary fixing material according to claim 19, having an adhesion to glass at 25° C. of 1.5 N/inch or less after being cured and heated at 300° C. for 10 minutes.

24. A method for producing an electronic component, comprising:

a temporary fixing step of temporarily fixing an electronic component to the temporary fixing material according to claim 19;

a curing step of curing the adhesive layer of the temporary fixing material;

a heat treatment step of heat-treating the electronic component; and a separation step of separating the electronic component from the temporary fixing material.

25. A method for producing an electronic component using the temporary fixing material according to claim 20, comprising:

a support bonding step of bonding the first adhesive layer of the temporary fixing material and a support;

an adherend bonding step of bonding the second adhesive layer of the temporary fixing material and an electronic component;

a curing step of curing the first adhesive layer and the second adhesive layer;

a heat treatment step of heat-treating the electronic component;

a gas generation step of generating gas from the first adhesive layer; and a separation step of separating the support and the temporary fixing material from each other.

* * * * *